(12) United States Patent
Chouanard et al.

(10) Patent No.: US 7,540,787 B2
(45) Date of Patent: Jun. 2, 2009

(54) FLEX-X MODULE WITH BOARD MOUNTED BALUNS

(75) Inventors: Harvey J. Chouanard, Deephaven, MN (US); Douglas G. Elliot, Waconia, MN (US); Soutsada Vongseng, Chanhassen, MN (US); Randall Wendland, Cologne, MN (US); James D. Dewey, Plymouth, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/787,219

(22) Filed: Apr. 12, 2007

(65) Prior Publication Data

US 2008/0254647 A1 Oct. 16, 2008

(51) Int. Cl.
*H01R 24/04* (2006.01)
(52) U.S. Cl. ...................................... 439/668
(58) Field of Classification Search ................ 439/668, 439/669
See application file for complete search history.

(56) References Cited

U.S. PATENT DOCUMENTS

| | | | |
|---|---|---|---|
| 3,852,703 A | 12/1974 | Carney et al. | |
| 4,548,453 A | 10/1985 | Mummey et al. | |
| 4,749,968 A | 6/1988 | Burroughs | |
| 4,753,609 A | 6/1988 | Pfeffer et al. | |
| 4,768,961 A | 9/1988 | Lau | |
| 4,770,639 A | 9/1988 | Lau | |
| 4,784,609 A | 11/1988 | Lau | |
| 4,797,114 A | 1/1989 | Lau | |
| 4,820,200 A | 4/1989 | Lau | |
| 4,826,439 A | 5/1989 | Lau | |
| 4,840,568 A | 6/1989 | Burroughs et al. | |

(Continued)

FOREIGN PATENT DOCUMENTS

DE 32 00 420 A1 7/1983

(Continued)

OTHER PUBLICATIONS

Eighteen color photos of Telect, Inc. co-axial and twisted pair jack assemblies.

(Continued)

*Primary Examiner*—Javaid Nasri
(74) *Attorney, Agent, or Firm*—Merchant & Gould P.C.

(57) ABSTRACT

The disclosure relates to a jack assembly including a jack mount for slidably receiving a jack that includes a plurality of conductive tip and ring springs. When plugs are received, the tip springs make electrical contact with tip contacts of the plugs and the ring springs make electrical contact with ring contacts of the plugs. When plugs are not received, the tip and ring springs make contact with normal contacts of the jack. The jack assembly also includes cross-connect contacts and a rear interface assembly. The rear interface assembly includes a dielectric support and a plurality of coaxial connectors projecting outwardly therefrom away from the jack mount. A circuit board is positioned between the jack mount and the dielectric support. The coaxial connectors are electrically connected to baluns mounted on a second circuit board mounted within the dielectric support. The second board is electrically connected to the first board by dual compliant pins. Electrical connections are established between the coaxial connectors and the tip and ring springs when the rear interface assembly is secured to the jack mount.

17 Claims, 19 Drawing Sheets

U.S. PATENT DOCUMENTS

| | | |
|---|---|---|
| 4,861,281 A | 8/1989 | Warner |
| 4,870,753 A | 10/1989 | Pfeffer et al. |
| 4,969,258 A | 11/1990 | Fisher et al. |
| 4,975,087 A | 12/1990 | Williams et al. |
| 4,976,634 A | 12/1990 | Green et al. |
| 5,092,029 A | 3/1992 | Fisher et al. |
| 5,145,416 A | 9/1992 | Cruise et al. |
| 5,170,327 A | 12/1992 | Burroughs |
| 5,199,878 A | 4/1993 | Dewey et al. |
| 5,233,501 A | 8/1993 | Allen et al. |
| 5,393,249 A | 2/1995 | Morgenstern et al. |
| 5,413,494 A | 5/1995 | Dewey et al. |
| 5,417,588 A | 5/1995 | Olson et al. |
| 5,439,395 A | 8/1995 | Laukzemis |
| 5,467,062 A | 11/1995 | Burroughs |
| 5,582,525 A | 12/1996 | Louwagie et al. |
| 5,634,822 A | 6/1997 | Gunell |
| 5,658,170 A | 8/1997 | Tan et al. |
| 5,685,741 A | 11/1997 | Dewey et al. |
| 5,738,546 A | 4/1998 | Burroughs et al. |
| 5,879,197 A | 3/1999 | Dewey |
| 5,885,096 A | 3/1999 | Ogren |
| 5,913,701 A | 6/1999 | Olson et al. |
| 5,938,478 A | 8/1999 | Werner |
| 6,116,961 A * | 9/2000 | Henneberger et al. ....... 439/668 |
| 6,352,451 B1 * | 3/2002 | Henneberger et al. ....... 439/668 |
| 6,554,652 B1 | 4/2003 | Musolf et al. |
| 6,575,792 B2 * | 6/2003 | Henneberger et al. ....... 439/668 |
| 6,623,280 B2 | 9/2003 | Oldenburg et al. |
| 6,626,705 B2 * | 9/2003 | Perrone et al. ............. 439/668 |
| 6,799,998 B2 * | 10/2004 | Henneberger et al. ....... 439/668 |
| 6,840,815 B2 * | 1/2005 | Musolf et al. ................ 439/668 |
| 6,881,099 B2 * | 4/2005 | Henneberger et al. ....... 439/668 |
| 6,918,793 B2 * | 7/2005 | Baker et al. ................. 439/668 |
| 7,083,475 B2 | 8/2006 | Henneberger et al. |
| 7,234,974 B2 | 6/2007 | Henneberger et al. |
| 2003/0013346 A1 | 1/2003 | Perrone et al. |
| 2003/0022559 A1 | 1/2003 | Musolf et al. |
| 2003/0064611 A1 | 4/2003 | Musolf et al. |
| 2004/0077220 A1 | 4/2004 | Musolf et al. |
| 2004/0077318 A1 | 4/2004 | Baker et al. |
| 2004/0106328 A1 | 6/2004 | Henneberger et al. ....... 439/668 |
| 2005/0026508 A1 | 2/2005 | Henneberger et al. ....... 439/668 |

FOREIGN PATENT DOCUMENTS

| | | |
|---|---|---|
| EP | 1 608 185 A2 | 12/2005 |
| WO | WO 94/08429 | 4/1994 |
| WO | WO 96/38884 | 12/1996 |
| WO | WO 99/26427 | 5/1999 |
| WO | WO 00/30219 | 5/2000 |
| WO | WO 00/60704 | 10/2000 |

OTHER PUBLICATIONS

Two sheets of drawings entitled "Sale Assembly SC330 "HiSpec" Connector With Plastic Pegs" dated Jun. 20, 1997. The drawings show a card edge connector product sold by Molex Incorporated.

"Longframe (310) DSX 28 Termination Panel", p. 31, ADC Telecommunications catalog entitled DSX Digital Signal Cross-Connect Second Edition, 1987 along with drawings showing ADC longframe bifurcated jacks representative of the type in the ADC longframe (310) DSX 28 termination panel.

EI 64 Circuit Panel. Telect Part No. E64-500-1100, http://www.telect.com/index.ofm?, Telect, 3 pages, (Jun. 12, 2001).

EI 64 Circuit Panel. Telect Part No. E64-500-1200, http://www.telect.com/index.ofm?, Telect, 3 pages, (Jun. 12, 2001).

RJ45 Chassis Assembly Installation Drawing, ADC, Catalog No. DFX-120001, 2 pages (Sep. 28, 2000).

International Search Report and Written Opinion mailed Aug. 11, 2008.

* cited by examiner

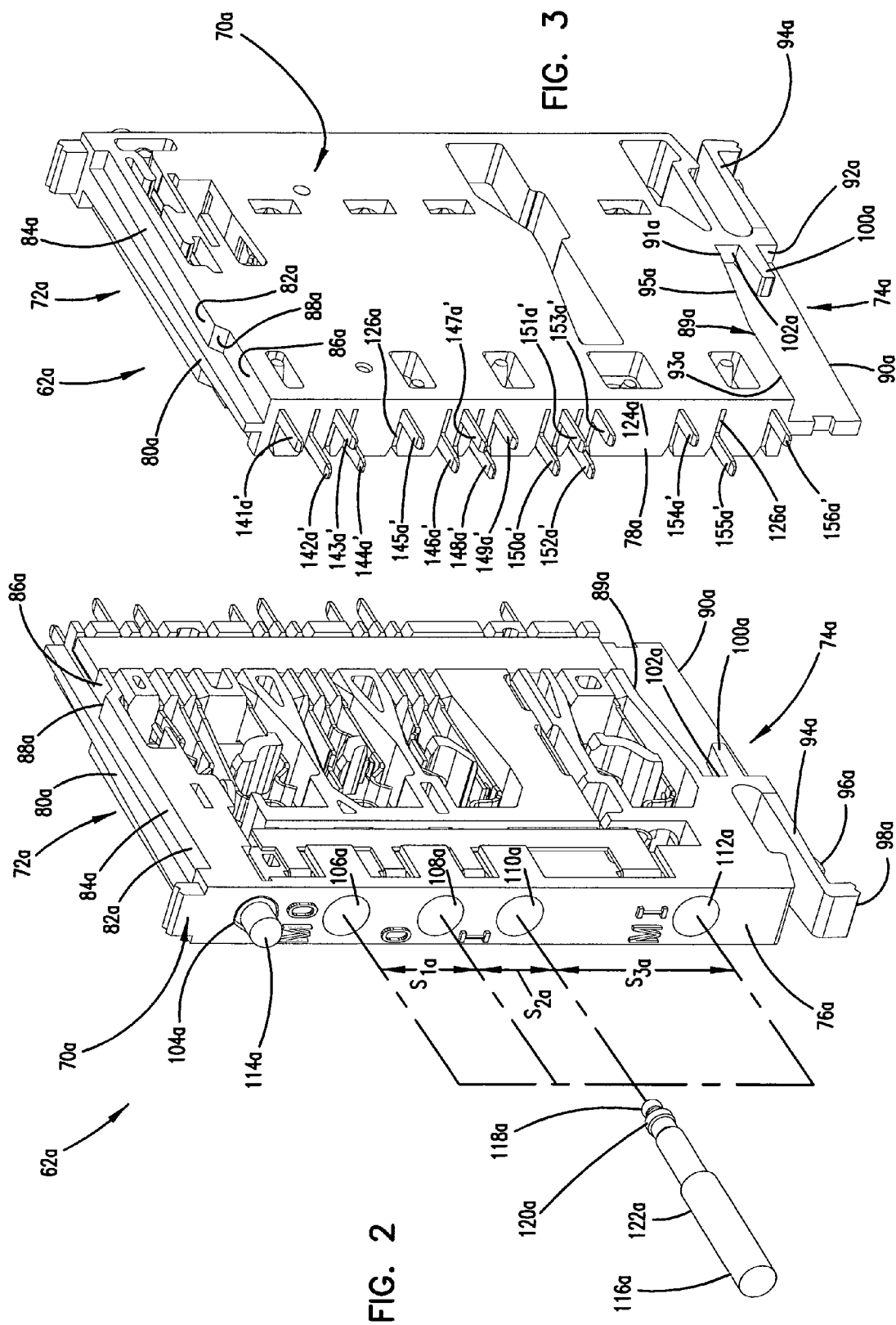

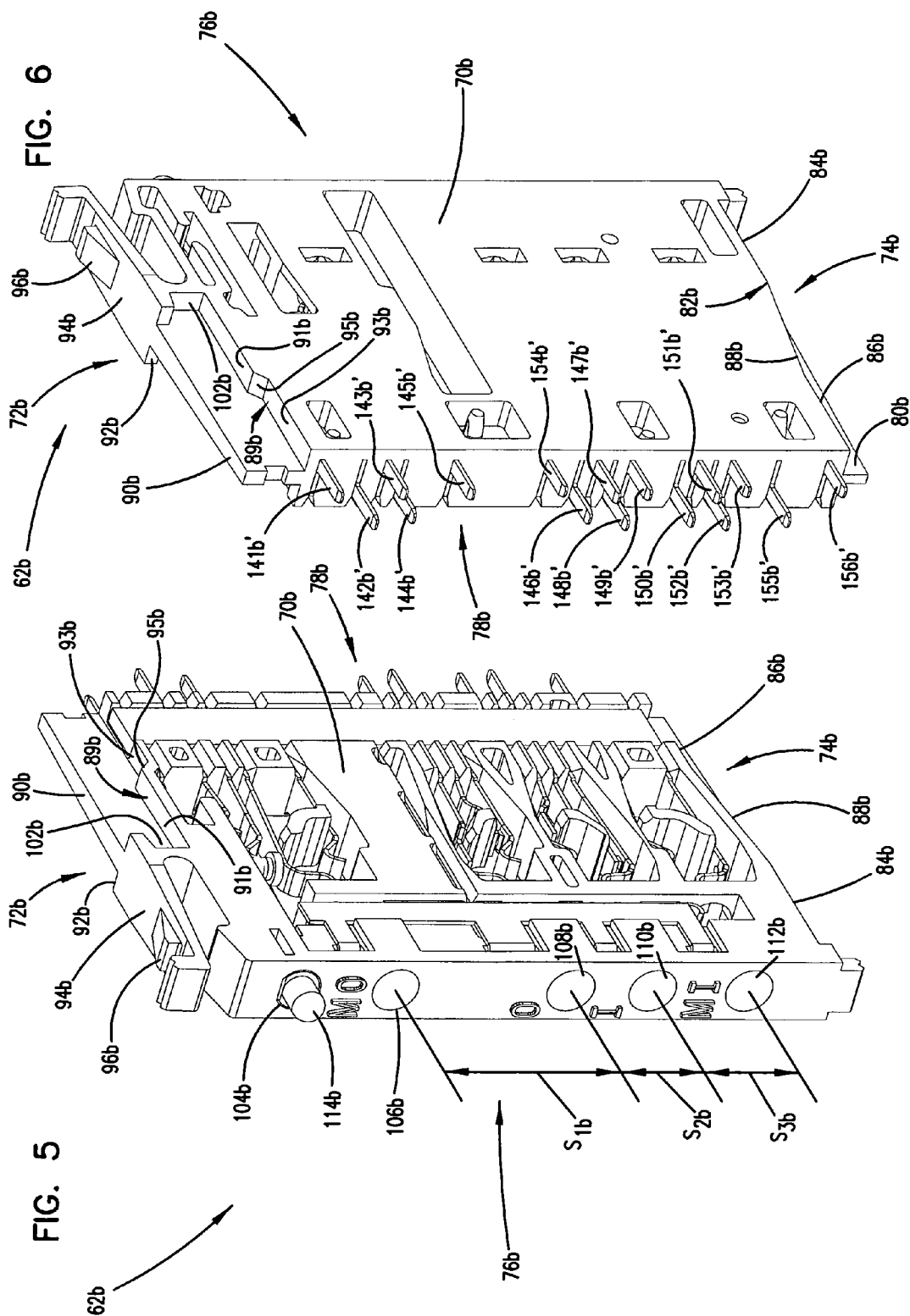

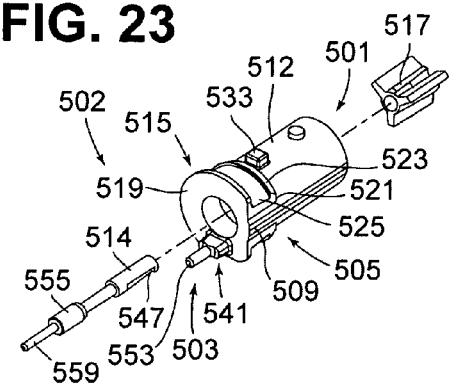
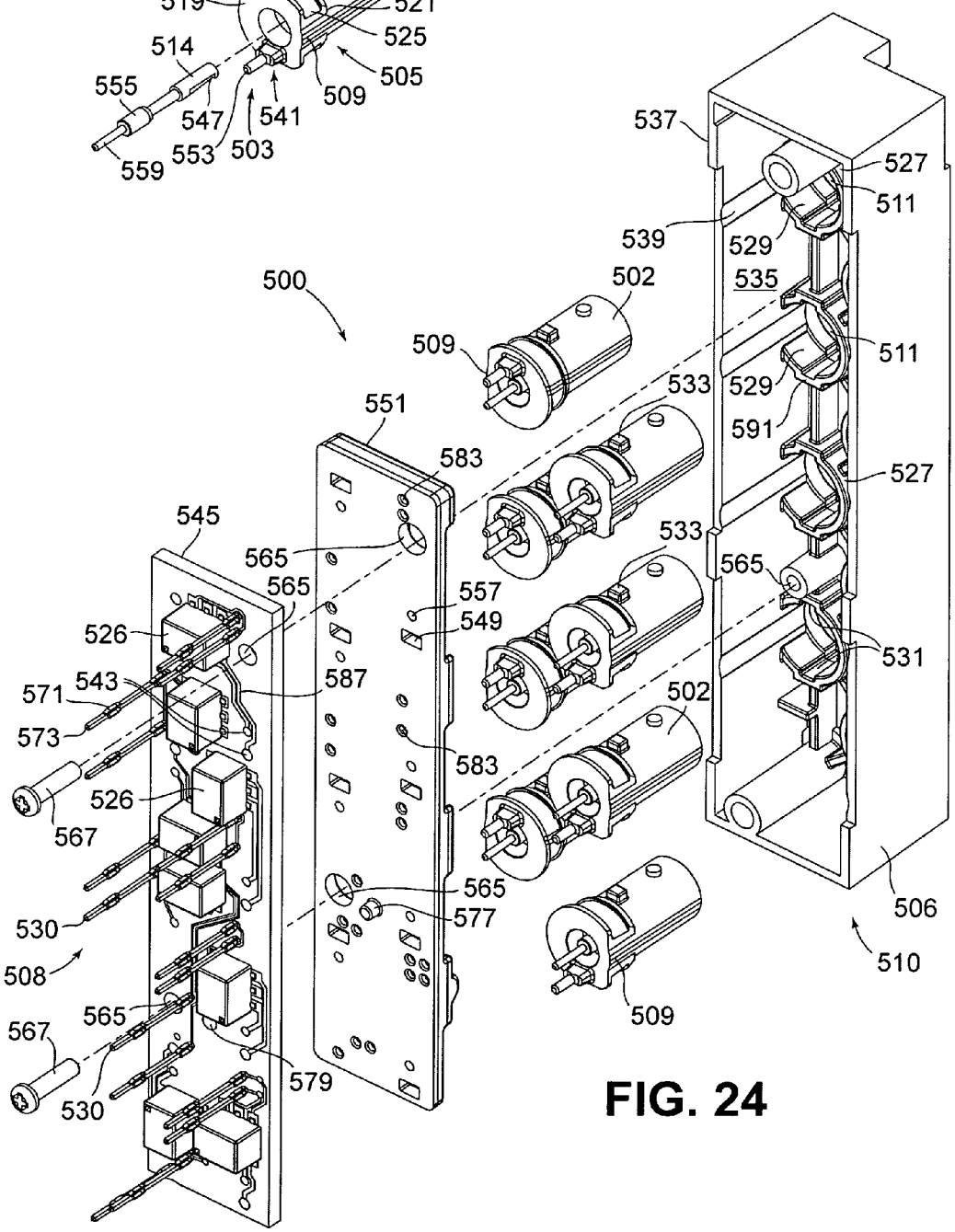
FIG. 23
FIG. 24

FLEX-X MODULE WITH BOARD MOUNTED BALUNS

TECHNICAL FIELD

The present disclosure relates generally to cross-connect assemblies and, in particular, to jack assemblies for digital cross-connect systems.

BACKGROUND

A digital cross-connect system (DSX) provides a location for interconnecting two digital transmission paths. The apparatus for a DSX is located in one or more frames, or bays, usually in a telephone central office. The DSX apparatus also provides jack access to the transmission paths.

DSX jacks are well known and typically include a plurality of bores sized for receiving tip-and-ring plugs. A plurality of spring contacts are provided within the bores for contacting the tip-and-ring plugs. The jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

SUMMARY

One aspect of the present disclosure relates to a jack assembly including a jack mount having a front side and a rear side. The jack mount has top and bottom supports defining a jack receiving region that opens outward toward the front side of the jack mount. A jack of the assembly is adapted to be slidably mounted in the jack receiving region defined between the top and bottom supports of the jack mount. The jack includes a jack body formed of a dielectric material, and a plurality of electrically conductive tip and ring springs. The jack body defines a plurality of bores sized to receive plugs having tip and ring contacts. The tip springs are adapted to make electrical contact with the tip contacts of the plugs when the plugs are inserted within the bores, and the ring springs are adapted to make electrical contact with the ring contacts of the plugs when the plugs are inserted within the bores. When plugs are not mounted within the bores, the tip and ring springs make electrical contact with normal contacts mounted within the jack. The jack assembly also includes a plurality of cross-connect contacts, and a rear interface assembly. The rear interface assembly includes a dielectric support having a first side that faces the jack mount and a second side that faces away from the jack mount. A plurality of rear connectors project outward from the second side of the dielectric support, and a circuit board is positioned between the jack mount and the dielectric support. The circuit board is configured to provide electrical connections between the rear connectors and the tip and ring springs. The circuit board also is configured to provide electrical connections between the cross-connect contacts and the normal contacts. The jack assembly further includes a resilient retaining member connected to one of the jack and the jack mount for securing the jack within the jack mount. The resilient retaining member is moveable between a first position in which the retaining member is adapted to retain the jack within the jack mount, and a second position in which the jack can be inserted into or removed from the jack mount. An electrical interface between the jack and the circuit board is configured such that when the jack is removed from the jack mount, the jack is electrically disconnected from the circuit board.

Another aspect of the present disclosure relates to a jack assembly including a jack mount having a front side and a rear side. A jack is positioned at the front side of the jack mount. The jack includes a jack body formed from a dielectric material. The jack body defines a plurality of bores each sized to receive a plug having a tip contact and a ring contact. The jack also includes a plurality of electrically conductive tip-and-ring springs. The tip springs are adapted to make electrical contact with the tip contacts of the plugs when the plugs are inserted within the bores, and the ring springs are adapted to make electrical contact with the ring contacts of the plugs when the plugs are inserted within the bores. The jack further includes a plurality of normal contacts adapted to normally make electrical contact with the tip-and-ring springs. A plurality of cross-connect contacts are electrically connected to the normal contacts of the jack. The jack assembly also includes first and second rear interface assemblies that can selectively be secured adjacent to the rear side of the jack mount. The first rear interface assembly includes a plurality of wire termination members that are electrically connected to the tip-and-ring springs when the first rear interface assembly is secured to the jack mount. The second rear interface assembly includes a plurality of coaxial connectors mounted on the dielectric support of the rear interface. The coaxial connectors are electrically connected to baluns that are mounted on a second circuit board within the dielectric support. The second circuit board is electrically connected to the first circuit board that is positioned between the jack mount and the dielectric support of the rear interface. The two circuit boards are connected with dual compliant pins and are configured to provide electrical connections between the rear connectors and the tip and ring springs when the second rear interface assembly is secured to the jack mount. The first and second rear interface assemblies allow a single common universal jack mount to interface either with standard twisted pair signal lines, or coaxial signal lines.

A further aspect of the present disclosure relates to a jack assembly including a jack mount having a front side and a rear side, and a jack positioned at the front side of the jack mount. The jack includes a jack body formed of a dielectric material. The jack body defines a plurality of bores each sized to receive a plug having a tip contact and a ring contact. The jack also includes a plurality of electrically conductive tip and ring springs. The tip springs are adapted to make electrical contact with the tip contacts of the plugs when the plugs are inserted within the bores, and the ring springs are adapted to make electrical contact with the ring contacts of the plugs when the plugs are inserted within the bores. The jacks further include a plurality of normal contacts adapted to normally make electrical contact with the tip-and-ring springs. A plurality of cross-connect contacts are electrically connected to the normal contacts of the jack. A rear interface assembly is positioned at the rear side of the jack mount. The rear interface assembly includes a dielectric support having a first side that faces the jack mount and a second side that faces away from the jack mount. The rear interface assembly further includes a circuit board and a plurality of baluns mounted on the circuit board and supported by the dielectric support, and a plurality of coaxial connectors that project outward from the second side of the support and are electrically connected to the baluns through the circuit board. Contact members, that are electrically connected to the baluns through the circuit board, project outward from the first side of the support. The contact members provide an electrical connection between the baluns and another circuit board. The second circuit board provides electrical connections between the contact members and the tip and ring springs of the jack, and also provides electrical connections between the cross-connect contacts and the normal contacts of the jack.

A variety of advantages of the inventive features of the disclosure will be set forth in part in the description that follows, and in part will be apparent from the description, or may be learned by practicing the inventive features. It is to be understood that both the foregoing general description and the following detailed description are exemplary and explanatory only and are not restrictive of the inventive aspects as claimed.

BRIEF DESCRIPTION OF THE DRAWINGS

The accompanying drawings, which are incorporated in and constitute a part of the description, illustrate several aspects of the inventive features and together with the description, serve to explain the principles of the disclosure. A brief description of the drawings is as follows:

FIG. 2 is a front perspective view of a jack in accordance with the principles of the present disclosure;

FIG. 3 is a rear perspective view of the jack of FIG. 2;

FIG. 5 is a front perspective view of an another jack in accordance with the principles of the present disclosure;

FIG. 6 is a rear perspective view of the jack of FIG. 5;

FIG. 23 is an exploded view of a coaxial connector configured for use in the rear interface assembly of FIG. 19;

FIG. 24 is an exploded view of the coaxial rear interface assembly of FIG. 21;

DETAILED DESCRIPTION

Reference will now be made in detail to exemplary aspects of the present disclosure which are illustrated in the accompanying drawings. Wherever possible, the same reference numbers will be used throughout the drawings to refer to the same or like parts.

I. Chassis Assembly

Figure 1:
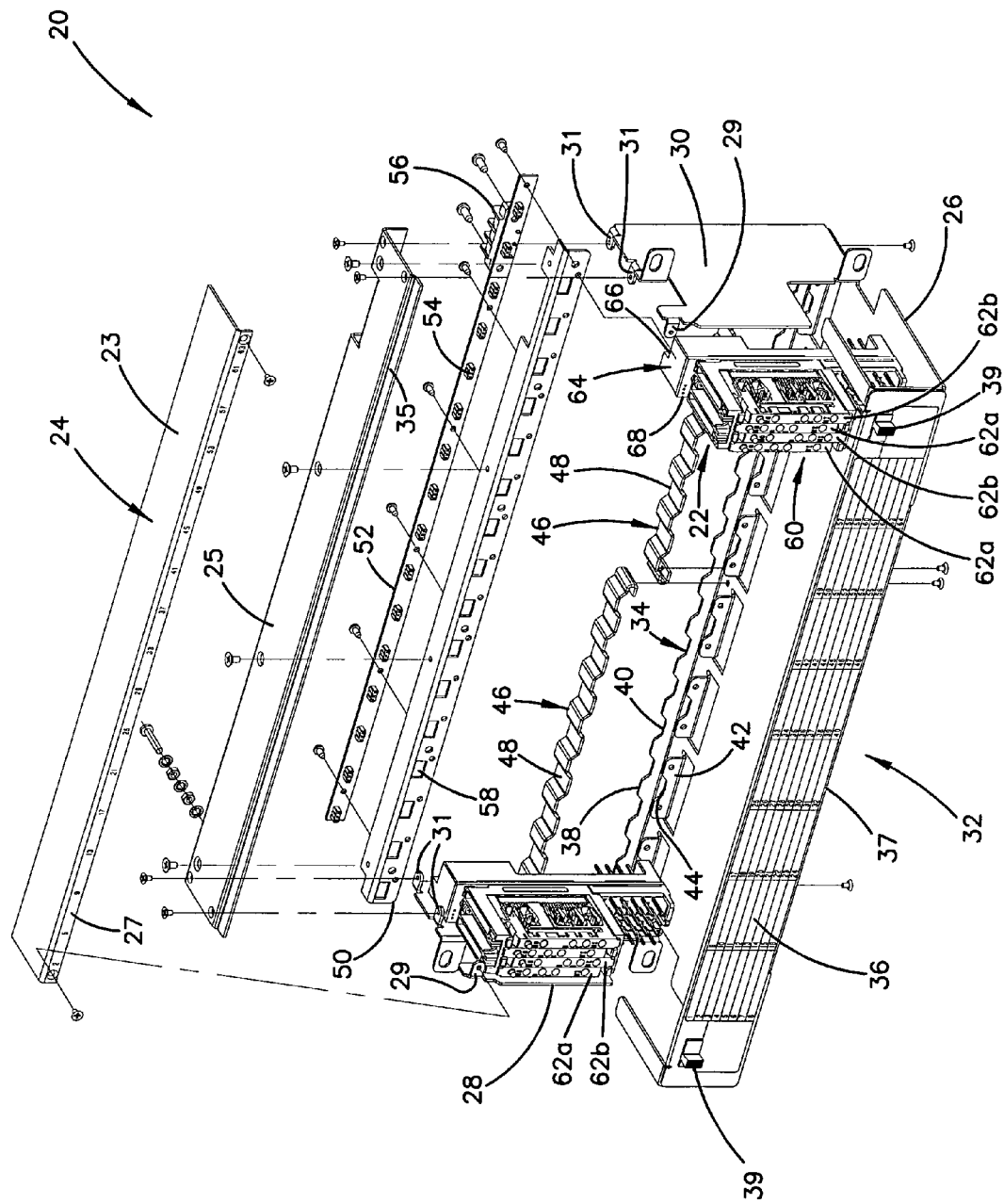
FIG. 1 is an exploded view of a chassis constructed in accordance with the principles of the present disclosure.

FIG. 1 is an exploded view of an embodiment of a chassis 20 for housing a plurality of jack mounts 22. For clarity, only two jack mounts 22 are shown in FIG. 1. However, it will be appreciated that the chassis 20 is adapted for housing a plurality of jack mounts 22. To conform with conventional international standards, the chassis 20 can house 16 jack mounts 22 and have a length of about 19 inches. Alternatively, in accordance with standard United States specifications, the chassis could be configured to house 21 jack mounts 22 and have a length of about 23 inches. Of course, other sizes and numbers of jack mounts could also be used.

The chassis 20 includes a top piece 24 positioned opposite from a bottom piece 26. The top and bottom pieces 24 and 26 are interconnected by left and right side walls 28 and 30. The chassis 20 also includes a front side 32 positioned opposite from a back side 34. The top piece 24 includes separate front and back components 23 and 25. The front component 23 is connected to the chassis 20 by fasteners (e.g., screws) that extend through a front lip 27 of the front component 23 and engage front tabs 29 provided on the side walls 28 and 30. The rear component 25 is connected to the chassis 20 by fasteners (e.g., screws) that extend downward through top tabs 31 provided on the side walls 28 and 30. The rear component 25 defines a recessed lip 35 for receiving a rear portion of the front component 23 to form a joint therebetween. The removable front component 23 assists in inserting or removing the jack mounts 22 into or from the chassis 20.

A wire tray door 36 is connected to the bottom piece 26 adjacent the front side 32 of the housing 20. A hinge 37 allows the door 36 to pivot between horizontal and vertical orientations. Latches 39 hold the door 36 in the vertical orientation. Additionally, a rear flange 38 projects upward from the bottom piece 26 adjacent the back side 34 of the chassis 20. The rear flange 38 defines a plurality of notches or cutaway portions 40. A plurality of mounting flanges 42 project upward from the bottom piece 26 between the front and back sides 32 and 34 of the chassis 20. The mounting flanges 42 are adapted for connecting the jack mounts 22 to the chassis 20. For example, the mounting flanges 42 are shown including holes for allowing the jack mounts 22 to be screwed or bolted to the mounting flanges 42. The mounting flanges 42 define cutaway portions 44 that correspond to alternating ones of the cutaway portions 40 defined by the rear flange 38.

Cover members 46 are positioned between the mounting flanges 42 and the rear flange 38. The cover members 46 define recesses 48 that align with the cutaway portions 40 and 44 respectively defined by the rear flange 38 and the mounting flanges 42. The cover members 46 function to conceal screws or other types of connecting members used to connect the jack mounts 22 to the mounting flanges 42. When coaxial rear interfaces (described later in the specification) are used in combination with the jack mounts 22, the cutaway portions 40 and 44 and the recesses 48 provide clearance for allowing the coaxial connectors to be accessed. In this manner, the height of the chassis 20 can be minimized while still providing access to the lowermost coaxial connectors.

The chassis 20 also includes a cover plate 50 connected below the top piece 24 of the chassis 20. A power strip 52 is connected to the front cover plate 50. The power strip 52 includes a plurality of electrical receptacles 54 electrically connected to a main power connector 56. The receptacles 54 align with and are set behind alignment openings 58 defined by the cover plate 50.

As shown in FIG. 1, the jack mount 22 is part of a jack assembly including odd jack inserts or jacks 62a, even jack inserts or jacks 62b, and a rear interface assembly 64. The rear interface assembly 64 includes a dielectric support 66, and a circuit board 68 positioned between the dielectric support 66 and the jack mount 22. The odd and even jacks 62a and 62b preferably have different configurations such that when the jacks 62a and 62b are mounted within the jack mount 22, plug bores defined by the jacks 62a and 62b are vertically staggered relative to one another.

II. Odd Jack Configuration

Figure 4:
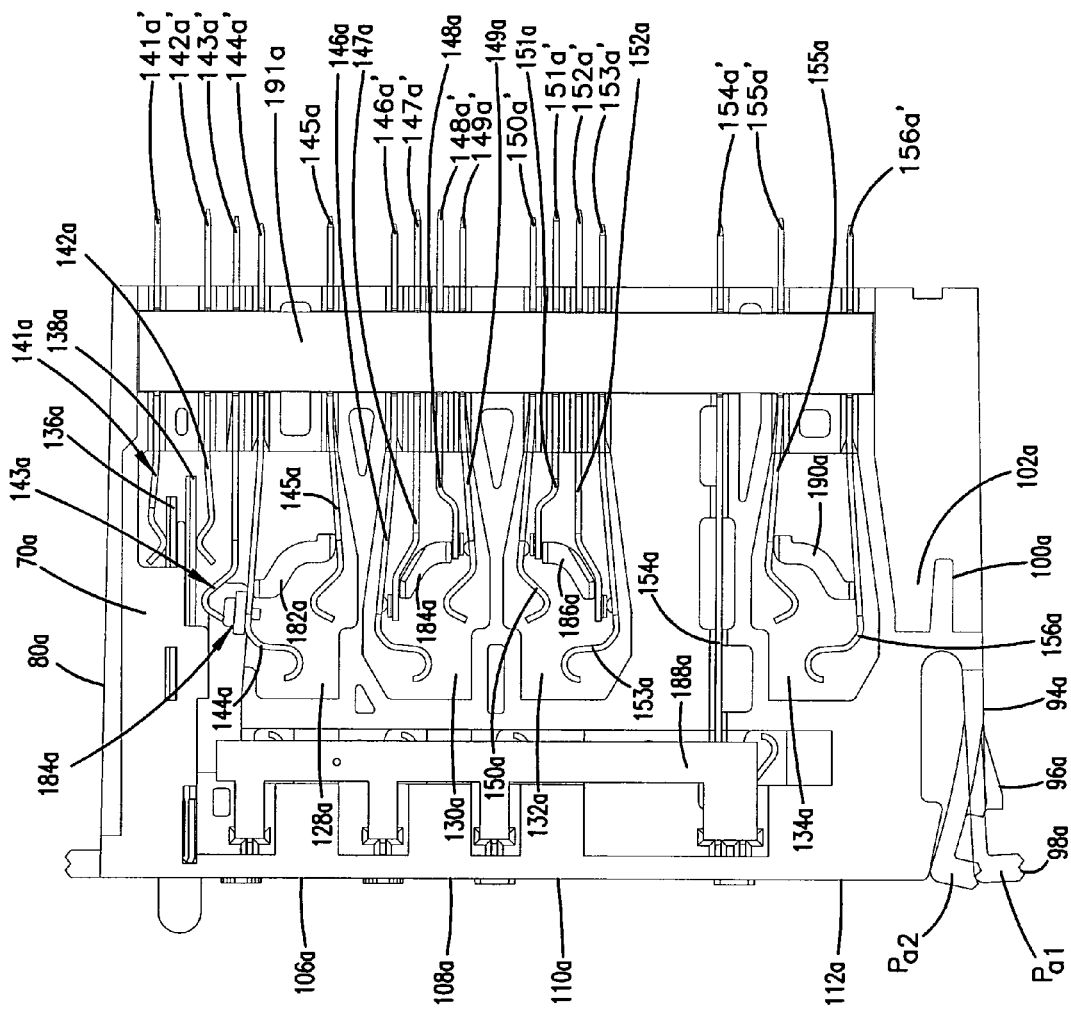
FIG. 4 is a side view of the jack of FIG. 2.

FIGS. 2-4 illustrate one of the odd jacks 62a in isolation from the jack mount 22. The jack 62a includes a dielectric jack body 70a. The dielectric jack body 70a includes a top side 72a and a bottom side 74a arranged and configured to slidingly interface with the jack mount 22. The jack body 70a also includes a front side 76a positioned opposite from a back side 78a. The top side 72a of the jack body 70a includes an elongated guide member 80a that extends between the front and back sides 76a and 78a of the jack body 70a. As best shown in FIG. 3, the guide member 80a tapers laterally outward as it extends from the back side 78a toward the front side 76a. Guide surfaces 82a are positioned on opposite sides of the guide member 80a. The guide surfaces 82a include substantially parallel front and rear portions 84a and 86a. The front and rear portions 84a and 86a are interconnected by ramped portions 88a such that the front portions 84a are elevated relative to the rear portions 86a.

The bottom side 74a of the jack body 70a includes a guide member 90a that extends between the back side 78a of the jack body 70a and a transverse wall 92a. The guide member 90a tapers laterally outward as it extends from the back side 78a toward the transverse wall 92a. The transverse wall 92a forms a base end of a cantilevered locking member 94a that extends from the transverse wall 92a toward the front side 76a of the jack body 70a. A locking tab 96a projects downward from the locking member 94a. A gripping member 98a projects downward from a free end of the locking member 94a. The locking member 94a preferably has a resilient or elastic structure such that the locking member 94a can be flexed upward by pressing upward on the gripping member 98a. By flexing the locking member 94a, the locking member 94a can be moved between a retaining position $P_{a1}$ (shown in FIG. 4) and a non-retaining position $P_{a2}$.

The bottom side 74a additionally includes alignment members 100a that project laterally outward from opposite sides of the guide member 90a. The alignment members 100a are also connected to the transverse wall 92a and at least partially define alignment notches 102a positioned above the alignment members 100a. Guide surfaces 89a are positioned above notches 102a and include front and rear portions 91a and 93a interconnected by a ramped portion 95a. The rear portions 93a are elevated relative to the front portions 91a.

As best shown in FIG. 2, the front side 76a of the jack body 70a is generally planar and defines a light emitting diode (LED) port 104a, a monitor out port 106a, an out port 108a, an in port 110a, and a monitor in port 112a. The LED port 104a is sized for receiving an LED 114a. Each of the other bores 106a, 108a, 110a and 112a is sized to receive a standard tip-and-ring plug 116a of known dimensions. The plug 116a includes a tip contact 118a, a ring contact 120a and a cylindrical sleeve 122a.

As shown in FIG. 3, the back side 78a of the jack body 70a is formed by a generally planar surface 124a that is generally parallel with respect to the front side 76a. The planar back surface 124a defines a plurality of back slots 126a each having a generally rectangular shape.

Referring now to FIG. 4, the jack body 70a also defines a monitor out chamber 128a, an out chamber 130a positioned below the monitor out chamber 128a, an in chamber 132a positioned below the out chamber 130a, and a monitor in chamber 134a positioned below the in chamber 132a.

The monitor out chamber 128a is in communication with both the LED port 104a and the monitor out port 106a. The LED 114a is mounted within the LED port 104a and includes first and second leads 136a and 138a that project into the monitor out chamber 128a. The first lead 136a is contacted by an electrically conductive voltage spring 141a, and the second lead 138a contacts an electrically conductive tracer lamp spring 142a. Electrically conductive tip-and-ring springs 145a and 144a are positioned within the monitor out chamber 128a in general alignment with the monitor out port 106a. The ring spring 144a and the tip spring 145a are separated by a dielectric spacer 182a that is integrally formed with the jack body 70a. A LED return spring 143a is positioned between the ring spring 144a and the tracer lamp spring 142a. When the tip-and-ring plug 116 is inserted within the monitor out port 106a, the ring spring 144a is flexed upwardly while the tip spring 145a is flexed downwardly. The ring spring 144a contacts the ring contact 120a, and the tip spring 145a contacts the tip contact 118a of the plug 116a. When the ring spring 144a is flexed upward, it causes the LED return spring 143a to contact the second lead 138a of the LED 114a thereby illuminating the LED 114a. A dielectric pad 184a attached to the ring spring 144a prevents the ring spring 144a from electrically contacting the LED return spring 143a.

The out chamber 130a is in communication with the out port 108a. Electrically conductive tip-and-ring springs 149a and 146a are positioned within the out chamber 130a in general alignment with the out port 108a. The tip-and-ring springs 149a and 146a are normally in electrical contact with the respective electrically conductive normal springs 148a and 147a. The normal springs 147a and 148a are separated by a dielectric spacer 184a that is integrally formed with the jack body 70a. When the plug 116a is inserted within the out port 108a, ring spring 146a is disconnected from normal spring 147a and electrically contacts the ring contact 120a of the plug 116a. Concurrently, tip spring 149a is disconnected from normal spring 148a and electrically contacts the tip contact 118a of the plug 116a.

The in chamber 132a is in communication with the in port 110a. Electrically conductive tip-and-ring springs 150a and 153a are positioned within the in chamber 132a in general alignment with the in port 110a. The tip-and-ring springs 150a and 153a are normally in electrical contact with respective electrically conductive normal springs 151a and 152a. Normal springs 151a and 152a are separated by a dielectric spacer 186a that is integrally formed with the jack body 70a. When the plug 116a is inserted within the in port 110a, the tip-and-ring springs 150a and 153a are respectively disengaged from the normal springs 151a and 152a, and respectively make electrical contact with the tip-and-ring contacts 118a and 120a of the plug 116a.

An electrically conductive sleeve ground spring 154a is positioned between the in chamber 132a and the monitor in chamber 134a. The ground spring 154a is electrically connected to a grounding strip 188a that has electrical contacts corresponding to each of the ports 106a, 108a, 110a and 112a. The contacts are configured to engage the sleeve 122a of the plug 116a when the plug is inserted within the ports 106a, 108a, 110a and 112a.

The monitor in chamber 134a of the jack body 70a is in communication with the monitor in port 112a. Electrically conductive tip-and-ring springs 155a and 156a are positioned within the monitor in chamber 134a in general alignment with the monitor in port 112a. A dielectric spacer 190a is positioned between the tip-and-ring springs 155a and 156a. When the plug 116a is inserted within the monitor in port 112a, the tip spring 155a makes electrical contact with the tip contact 118a and the ring spring 156a makes electrical contact with the ring contact 120a.

Referring to FIG. 4, the springs 141a-156a are preferably held within the jack body 70a by a dielectric strip 191a. The dielectric strip 191a is preferably press-fit or snapped within a corresponding slot defined by the jack body 70a.

As best shown in FIG. 3, electrically conductive springs 141a-156a each include portions 141a'-156a' that extend through the slots 126a defined by the back side 78a of the jack body 70a. The portions 141a'-156a' project outward from the back side 78a and form generally flat contact members adapted for electrically connecting the springs 141a-156a to a desired structure. As shown in FIG. 4, the portions 141a'-156a' have projection lengths that vary such that the tips of the portions 141a'-156a' are staggered. The staggered tips reduce the insertion force required to connect the jack 62a to a desired structure because all of the tips do not engage the desired structure simultaneously upon insertion.

III. Even Jack Configuration

Figure 7:
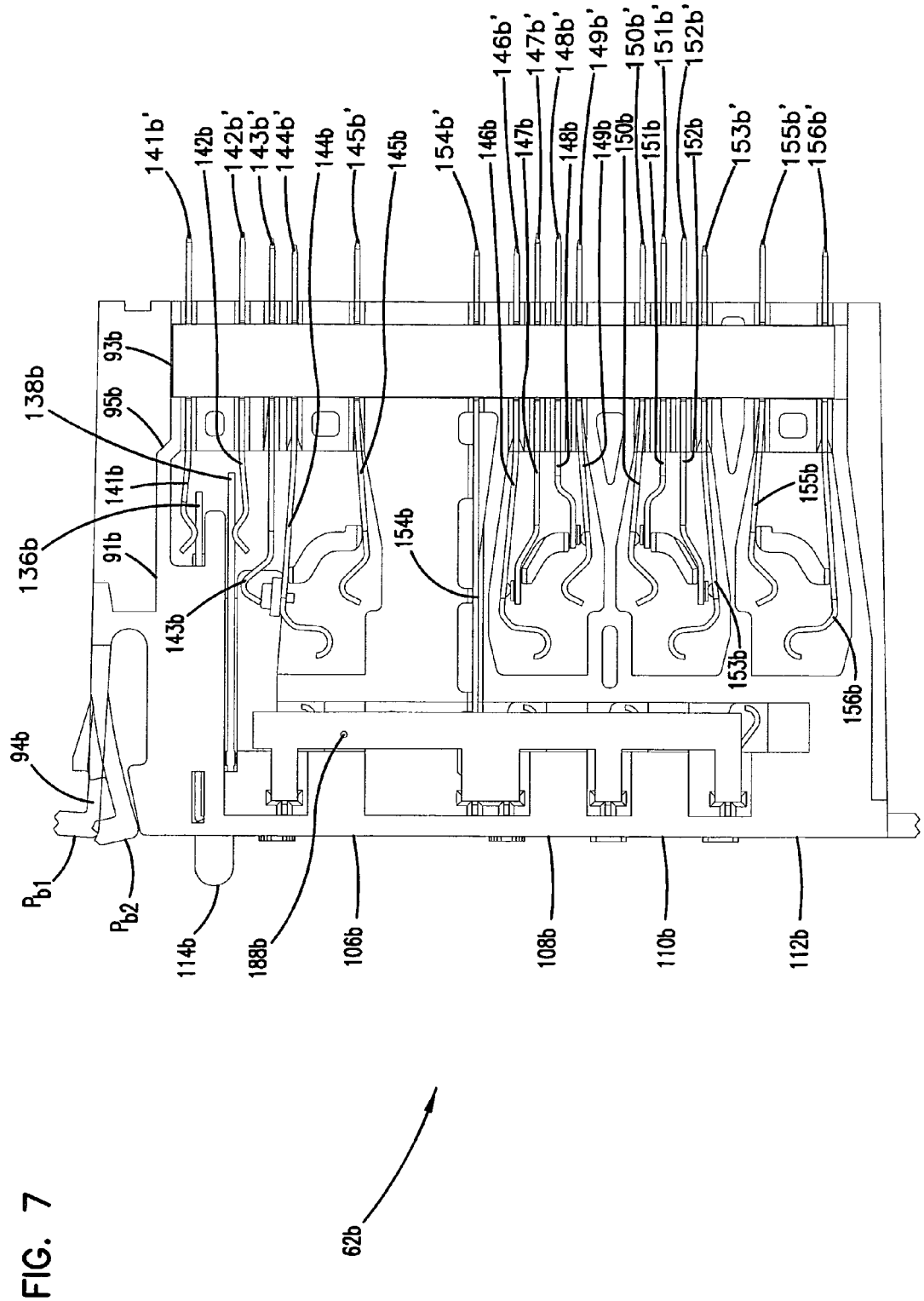
FIG. 7 is a side view of the jack of FIG. 5.

FIGS. 5-7 illustrate one of the even jacks 62b in isolation from the jack mount 22. The jack 62b includes a dielectric jack body 70b having a top side 72b positioned opposite from a bottom side 74b, and a front side 76b positioned opposite from a back side 78b. The top side 72b includes a laterally tapered guide member 90b, and a resilient locking member 94b having an upwardly projecting locking tab 96b. The locking member 94b can be flexed between a retaining position $P_{b1}$ and a non-retaining position $P_{b2}$. A transverse wall 92b is positioned generally between the locking member 94b and the guide member 90b. Alignment notches 102b are formed generally below the transverse wall 92b on opposite sides of the guide member 90b. Guide surfaces 89b are positioned below the notches 102b on opposite sides of the guide member 90b. The guide surfaces 89b include front portions 91b elevated relative to rear portions 93b, and ramped portions 95b positioned between the front and rear portions 91b and 93b.

The bottom side 74b of the jack body 70b includes an elongated guide member 80b extending between the front and back sides 76b and 78b. The guide member 80b tapers laterally outward as it extends from the back side 78b toward the front side 76b. The bottom side 74b also includes guide surfaces 82b positioned on opposite sides of the guide member 80b. The guide surfaces 82b include substantially parallel front and back portions 84b and 86b. A ramped portion 88b interconnects the front and back portions 84b and 86b such that the back portions 86b are elevated relative to the front portions 84b.

It will be appreciated that the top and bottom sides 72b and 74b of the jack body 70b have different configurations than the top and bottom sides 72a and 74a of the jack body 70a. Preferably, the top and bottom sides of the jack bodies 70a and 70b have varying configurations in order to provide a keying function. For example, by varying the configurations of the top and bottom sides of the jack bodies 70a and 70b, a user is prevented from placing the jacks 62a and 62b in the wrong positions on the jack mount 22. The user is also inhibited from inserting the jacks 62a and 62b upside-down into the jack mount 22.

As shown in FIG. 5, the front side 76b of the jack body 70b defines an LED port 104b, a monitor out port 106b, an out port 108b, an in port 110b, and a monitor in port 112b. It will be appreciated that the ports 104b, 106b, 108b, 110b and 112b are arranged in a different pattern than the ports 104a, 106a, 108a, 110a and 112a. For example, a larger spacing exists between the monitor out port 106b and the out port 108b as compared to the monitor out port 106a and the out port 108a. Additionally, a reduced spacing exists between the in port 110b and the monitor in port 112b as compared to the in port 110a and the monitor in port 112a. It will be appreciated that the terms "port" and "bore" are intended to be used interchangeably.

The jack 62b has similar internal components to those previously described with respect to the jack 62a. For example, the jack 62b includes an LED 114b electrically connected to a voltage spring 141b and a tracer lamp spring 142b by leads 136b and 138b. An LED ground spring 143b is used to complete the circuit and light the LED 114b. The jack 62b also includes tip-and-ring springs 145b and 144b corresponding to the monitor out port 106b, tip-and-ring springs 149b and 146b corresponding to the out port 108b, tip and ring springs 150b and 153b corresponding to the in port 110b and tip-and-ring springs 155b and 156b corresponding to the monitor in port 112b. The ring-and-tip springs 146b and 149b normally contact respective normal springs 147b and 148b, and tip-and-ring springs 150b and 153b normally contact respective normal springs 151b and 152b. The jack 62b also includes a sleeve ground spring 154b interconnected to a grounding strip 188b having sleeve contacts corresponding to each of the ports 106b, 108b, 110b and 112b. The conductive springs 141b-156b each include end portions 141b'-156b' (best shown in FIG. 6) that project outward from the back side 78b of the jack body 70b so as to form electrical contact members. As shown in FIG. 7, the tips of the end portions 141a'-156a' are staggered.

IV. The Jack Mount

Figure 8:
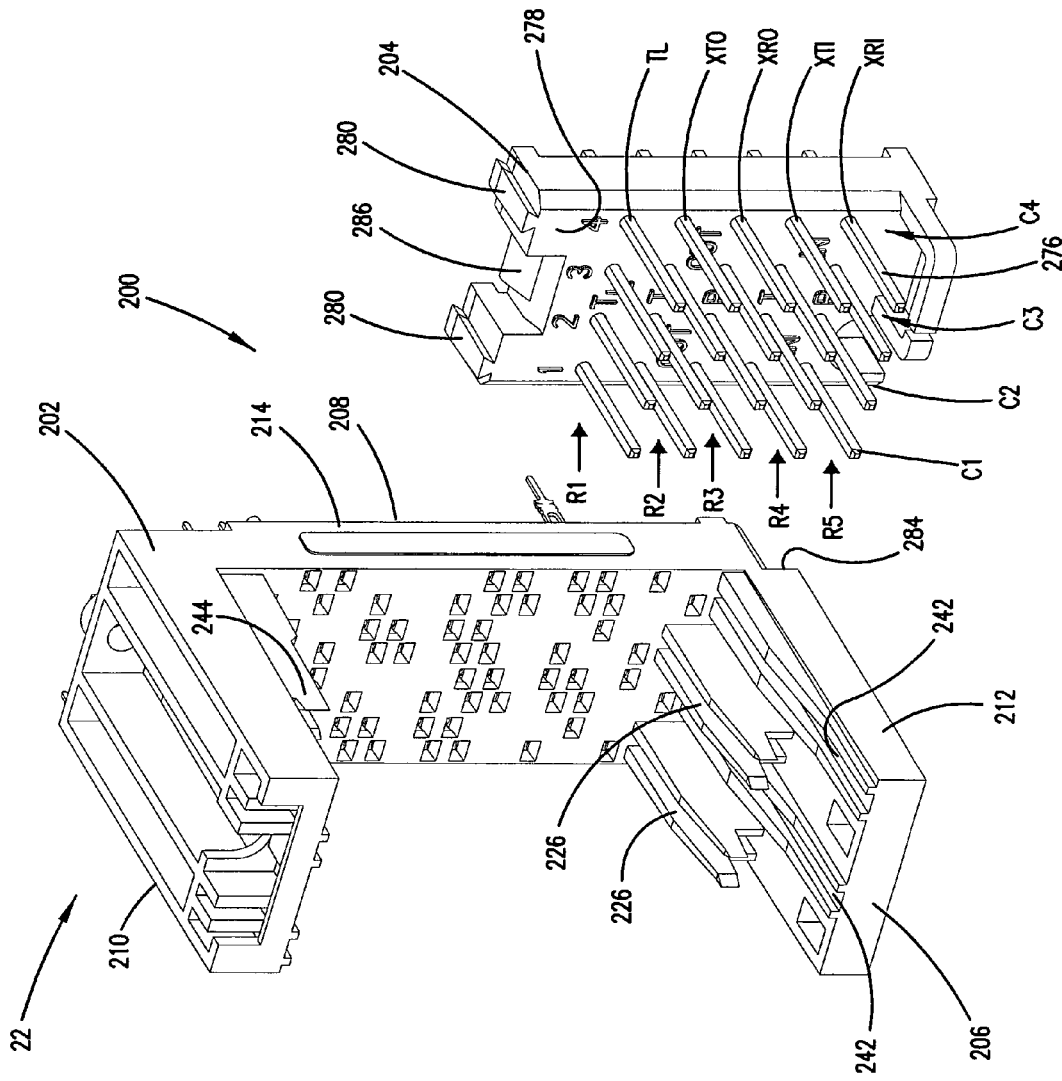
FIG. 8 is a front perspective view of jack mount in accordance with the principles of the present disclosure.

Referring now to FIG. 8, the jack mount 22 is shown in isolation from the chassis 20 with the jacks 62a and 62b removed. Generally, the jack mount 22 includes a mounting body 200 made of a dielectric material. The mounting body 200 includes a jack receiving piece 202 that can be detachably connected to a cross-connect piece 204. As will be described in greater detail below, the jack receiving piece 202 is adapted for housing or holding the jacks 62a and 62b, while the cross-connect piece 204 is adapted for providing cross-connects between jacks.

The jack receiving piece 202 of the mounting body 200 includes a front side 206 positioned opposite from a back side 208. The piece 202 also includes spaced-apart and substantially parallel top and bottom supports 210 and 212 that extend generally between the front and back sides 206 and 208. The top and bottom supports 210 and 212 are interconnected by a back wall 214 of the jack receiving piece 202. The top support 210, the bottom support 212 and the back wall 214 cooperate to define a jack mounting region or recess that opens outward toward the front side 206 of the upper piece 202.

Figure 9:
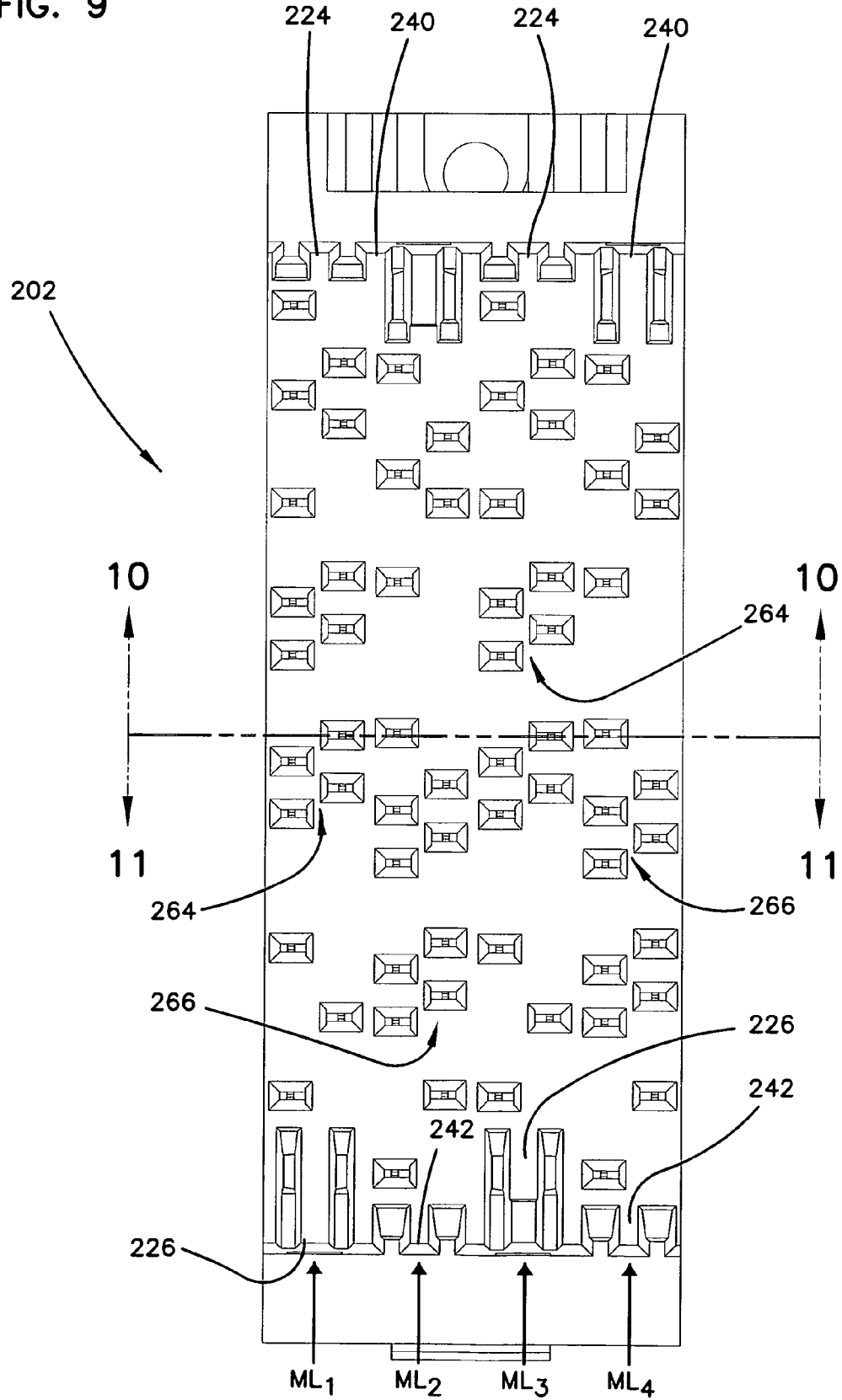
FIG. 9 is a front view of a portion of the jack mount of FIG. 8.

As shown in FIG. 9, the jack receiving piece 202 of the mounting body 200 defines four separate jack mounting locations $ML_1$, $ML_2$, $ML_3$ and $ML_4$. Jack mounting locations $ML_1$ and $ML_3$ are adapted to receive the odd jacks 62a, while mounting locations $ML_2$ and $ML_4$ are adapted for receiving the even jacks 62b.

Mounting locations $ML_1$ and $ML_3$ each include top and bottom channels 224 and 226 respectively formed on the top support 210 and the bottom support 212. The top and bottom channels 224 and 226 are configured to respectively complement the top and bottom sides 72a and 74a of the jacks 62a. For example, referring to FIG. 10, the top channels 224 are tapered so as to compliment or match the taper of the guide members 80a formed on the top sides 72a of the jack bodies 70a. Additionally, the walls forming the top channels 224 have downwardly facing guide surfaces 228 including front portions 230, rear portions 232 and ramped portions 234 that respectively correspond to and complement the front portions 84a, rear portions 86a and ramped portions 88a of the guide surfaces 82a positioned along the top side 72a of the jack body 70a.

Figure 11:
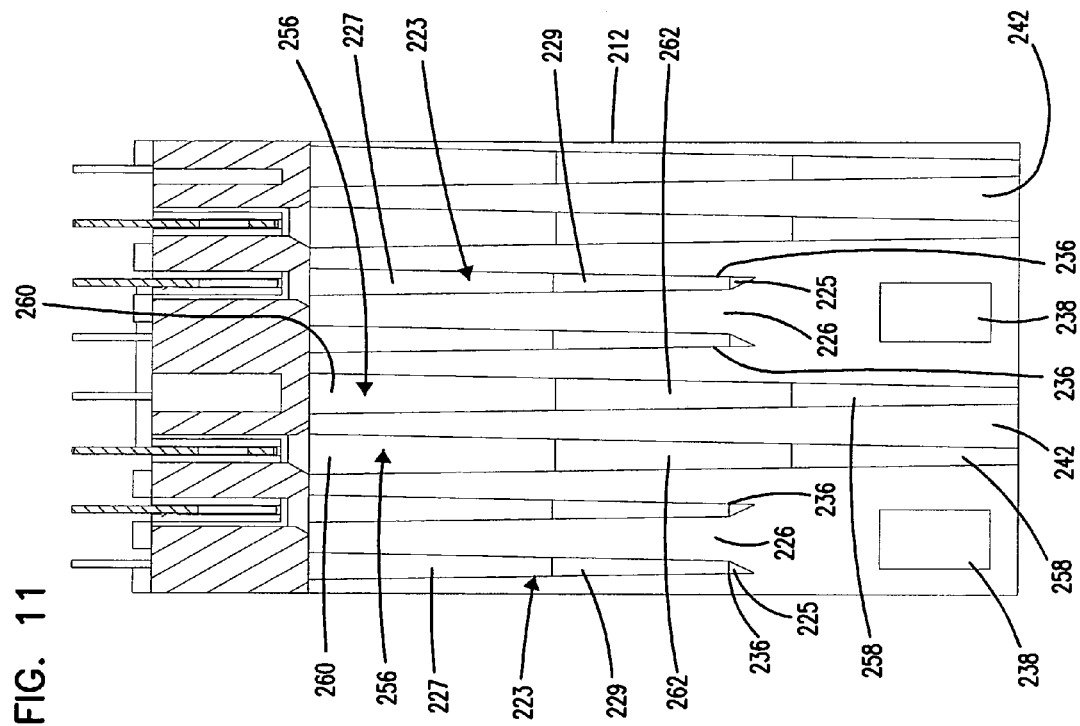
FIG. 11 is a cross-sectional view taken along section line 11-11 of FIG. 9.

As shown in FIG. 11, the bottom channels 226 are tapered so as to complement or correspond to the taper of the guide member 90a positioned at the bottom side 74a of the jack body 70a. The bottom channels 226 also include end projections 236 adapted to mate with or fit within the alignment notches 102a formed adjacent the bottom side 74a of the jack body 70a. The walls forming the channels 226 have upwardly facing guide surfaces 223 including front, rear and ramped portions 225, 227 and 229 that respectively complement the front, rear, and ramped portions 91a, 93a and 95a of the guide surfaces 89a formed on the bottom side of each jack 62a.

The jack 62a is mounted within one of the mounting locations $ML_1$ and $ML_3$ by inserting the rear ends of the guide members 80a and 90a respectively within the top and bottom channels 224 and 226. The jack 62a is then pushed inward toward the back wall 214 of the jack receiving piece 202 causing the guide members 80a and 90a to respectively slide along the top and bottom channels 224 and 226. When the jack 62a has been fully inserted into the jack receiving piece 202, the locking tab 96a of the resilient locking member 94a snaps within a hole 238 (shown in FIG. 11) defined by the bottom support 212. To remove the jack 62a from the jack mount 22, the resilient locking member 94a is flexed from the retaining position $P_{a1}$ to the non-retaining position $P_{a2}$ such that the locking tab 96a is displaced from the hole 238. The jack 62a can then be manually pulled out from the jack receiving piece 202.

Figure 10:
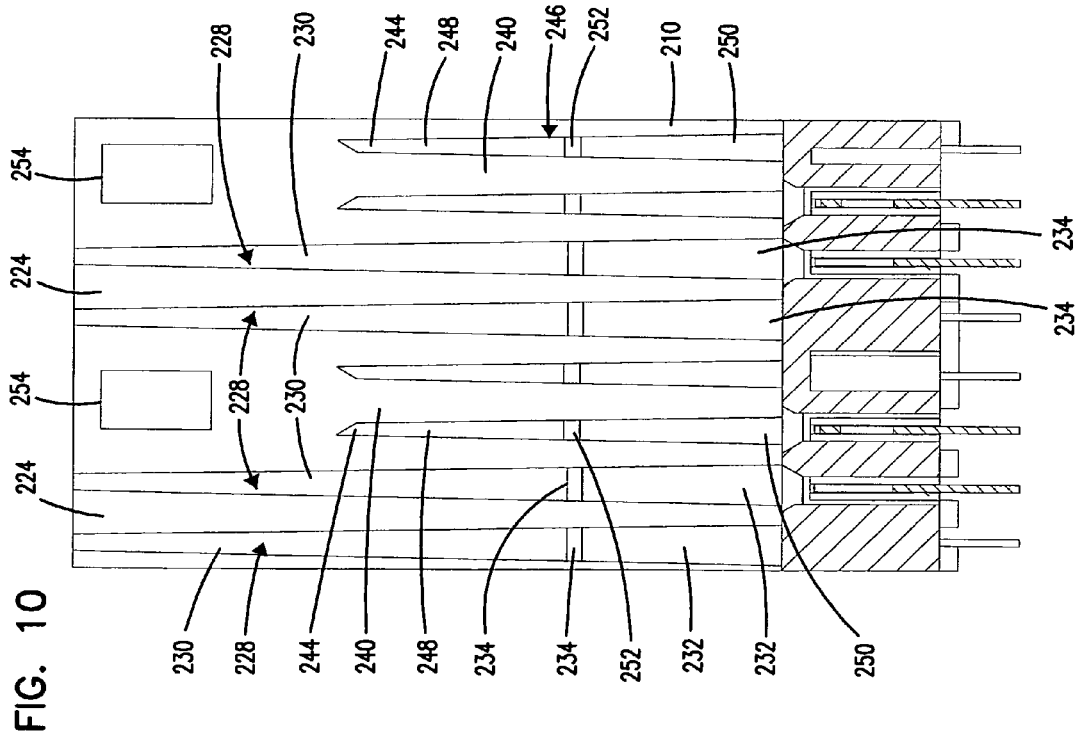
FIG. 10 is a cross-sectional view taken along section line 10-10 of FIG. 9.

Jack mounting locations $ML_2$ and $ML_4$ each define top and bottom channels 240 and 242 respectively formed on the top support 210 and the bottom support 212. The top channels 240 are configured to complement the shape of the top side 72b of the jack 62b. For example, the top channels 240 are tapered so as to complement the taper of the guide member 90b formed on the top side 72b of the jack 62b. As shown in FIG. 10, the top channels 240 also include projections 244 adapted to fit within the alignment notches 102b formed on the jack body 70b adjacent the top side 72b. Furthermore, the walls defining the top channel 240 include downwardly facing guide surfaces 246 including front portions 248, rear portions 250 and ramped portions 252 that respectively complement the front, rear and ramped portions 91b, 93b and 95b of the guide surfaces 89b formed on the top side 72b of the jack body 70b. It is further noted that the top support 210 defines openings 254 arranged and configured to receive the locking tab 96b of the jack body 70b when the jack 62b is mounted within the jack mount 22.

The bottom channels 242 are each configured to compliment the bottom side 74b of the jack body 70b. For example, as shown in FIG. 11, the bottom channels 242 are tapered to correspond with the taper of the guide member 80b formed on the bottom side 74b of the jack body 70b. Additionally, the walls defining the bottom channels 242 include guide surfaces 256 having front, rear and ramped portions 258, 260 and 262 arranged and configured to respectively complement the front, rear and ramped portions 84b, 86b and 88b of the guide surfaces 82b formed on the bottom side 74b of the jack body 70b.

The top and bottom channels 224, 226 of mounting locations $ML_1$ and $ML_3$, and the top and bottom channels 240, 242 of mounting locations $ML_2$ and $ML_4$ have been designed in coordination with the top and bottom sides of the jacks 62a and 62b in order to provide a keying function. For example, the jack 62a can only be mounted in the jack mount 22 if it is oriented in an upright position and is inserted into either one of the jack mounting locations $ML_1$ and $ML_3$. Interference between the top and bottom sides of the jack 62a and the top and bottom channels 240 and 242 prevents the jack 62a from being inserted into either one of mounting locations $ML_2$ and $ML_4$. Similarly, the even jack 62b can only be mounted at mounting locations $ML_2$ and $ML_4$. If the user attempts to insert the jack 62b into either of the jack mounting locations $ML_1$ and $ML_3$, the jack 62b will bind with the top and bottom channels 224 and 226 thereby preventing the jack 62b from being fully inserted into the jack mount 22.

As shown in FIG. 9, mounting locations $ML_1$ and $ML_3$ each include a corresponding pattern or array of openings 264 defined through the back wall 214 of the jack receiving piece 202 of the mounting body 200. The openings 264 are configured to receive the spring ends 141a'-156a' that project outward from the back side 78a of each jack 62a. Similarly, each of mounting locations $ML_2$ and $ML_4$ includes a corresponding pattern or array of openings 266 formed through the back wall 214 of the jack receiving piece 202 of the mounting body 200. The openings 266 are configured to receive the spring ends 141b'-156b' that project outward from the back side 78b of each jack 62b.

Figure 12:
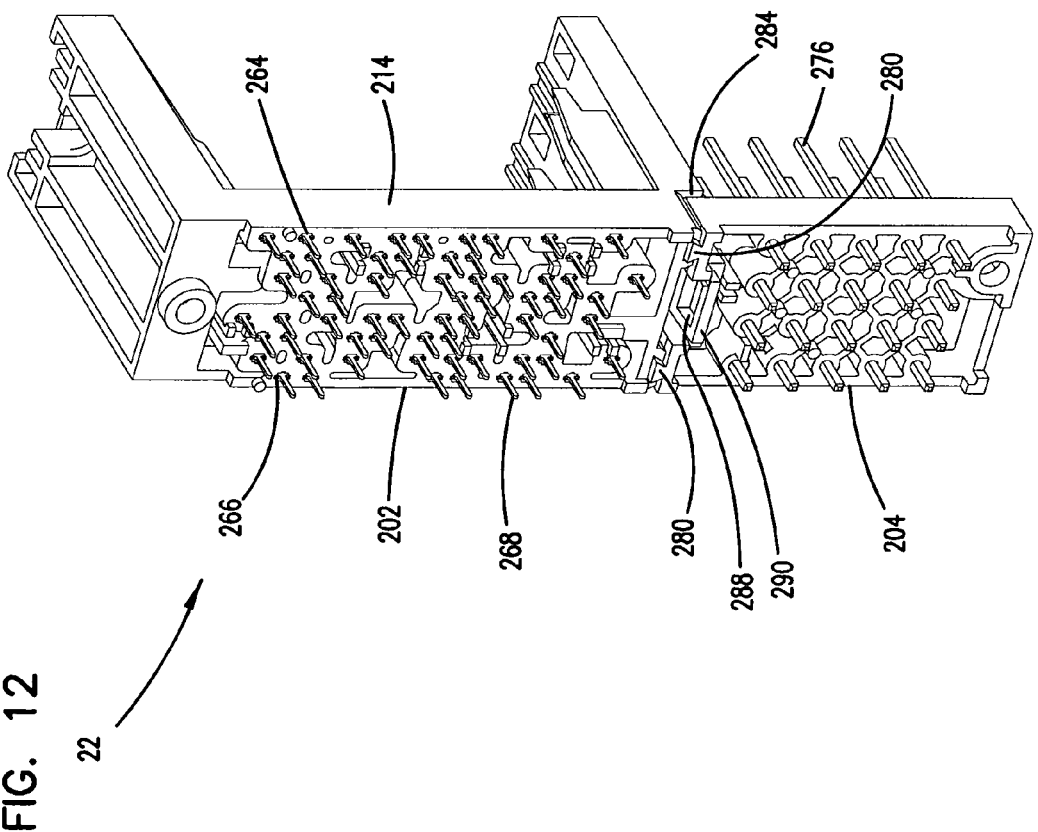
FIG. 12 is a rear perspective view of the jack mount of FIG. 8.
Figure 14:
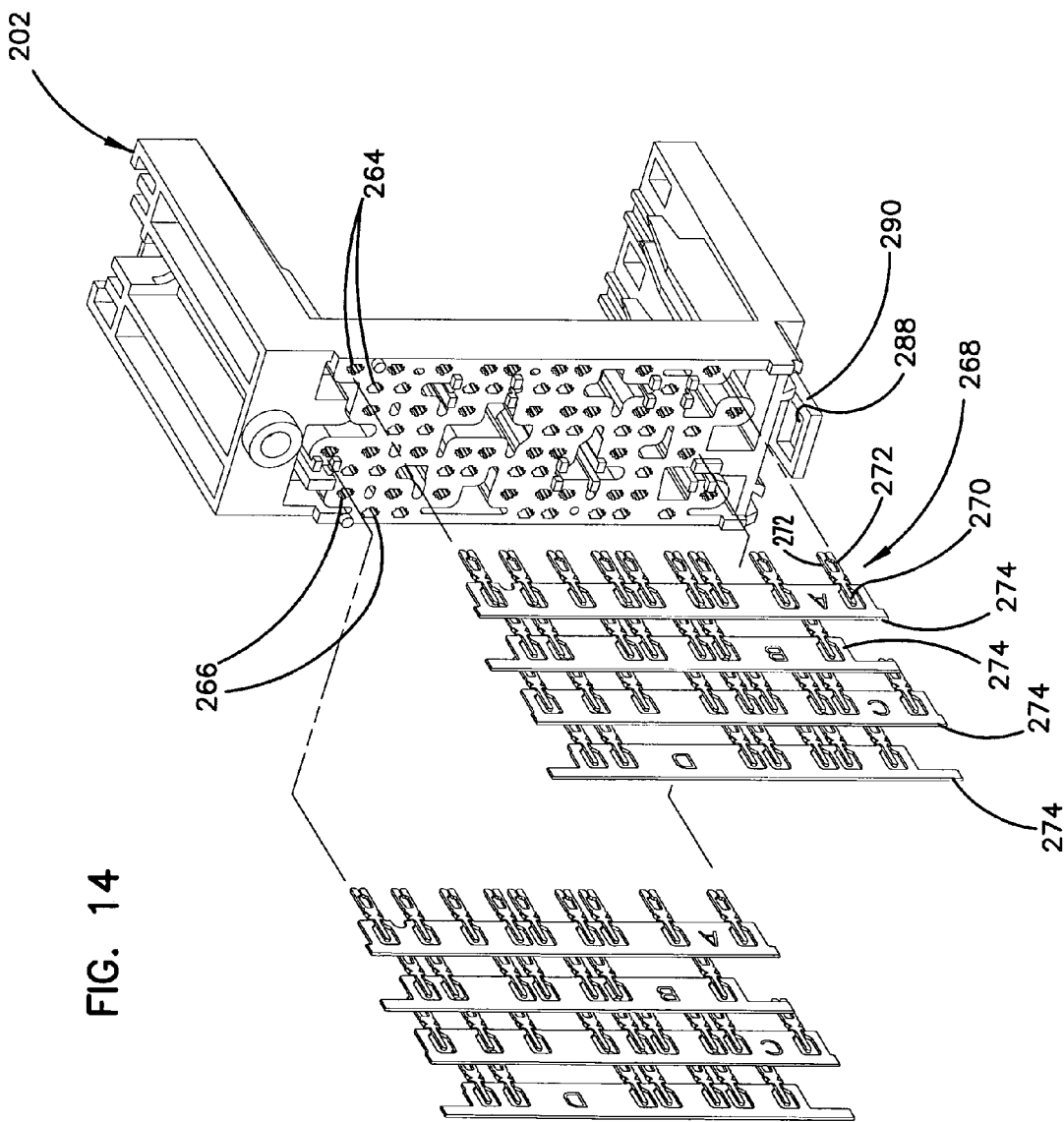
FIG. 14 is an assembly view of the jack mount of FIG. 8.

Referring to FIG. 12, the openings 264 and 266 extend completely through the back wall 214. Connection pins 268 are mounted within each of the openings 264 and 266. As shown in FIG. 14, each of the connection pins 268 includes a pin portion 270 that projects outward from the back side 208 of the jack receiving piece 202, and two opposing, cantilevered contact members 272 that are press fit within the openings 264 and 266. In the assembly view of FIG. 14, the connection pins 268 are shown connected to elongated installation tools 274 (e.g., the connection pins 268 and the installation tools 274 have been stamped from a common strip of conductive material). The installation tools 274 maintain a vertical spacing between the connection pins 268 that corresponds to the vertical spacing of the openings 264 and 266. For example, the installation tools 274 labeled A and B align the connection pins 268 in a pattern that corresponds to the pattern defined by the openings 264. The installation tools 274 labeled C and D align the connection pins 268 in a pattern that corresponds to the pattern defined by the openings 266. The installation tools 274 are used to press multiple pins 268 in the openings 264 and 266 at once. After the pins have been pressed within the openings 264 and 266, the tools 274 are laterally twisted causing the pins to break-off within the openings 264 and 266.

When the jacks 62a are mounted within the jack mount 22, the spring extensions 141a'-156a' fit within the openings 264 and are compressed between the opposing contact members 272 of the connection pins 268 such that the spring contacts 141a-156a are electrically connected to the pins 268. Similarly, when the jacks 62b are mounted within the jack mount 22, the spring extensions 141b'-156b' fit within the openings 266 and are compressed between the opposing contact members 272 of the connection pins 268 to provide an electrical interface between the jack springs 141b-156b and the connection pins 268. The variable lengths of the spring extensions 141a'-156a' and 141b'-156b' assist in reducing the insertion force required to press the spring extensions between the contact members 272.

Referring back to FIG. 8, the cross-connect piece 204 of the mounting body 200 is adapted for providing cross-connections between jacks. For example, four columns ($C_1$-$C_4$) and five rows ($R_1$-$R_5$) of wire termination members 276 (e.g., wire wrap members or posts) are shown projecting outward from a front face 278 of the piece 204. It will be appreciated that the removability of the cross-connect piece 204 from the jack receiving piece 202 is significant because different types of wire termination members or contacts can be used to provide cross-connections. For example, for certain applications, it may be desired to use insulation displacement connectors (IDC) for providing cross-connections between jacks. By using cross-connect pieces 204 that are separate from the jack mounting portion 202, cross-connect pieces having different types of connectors can be used with the common base to enhance manufacturing efficiency. While wire wrap members and insulation displacement connectors have been specifically described, it will be appreciated that other types of connectors could also be used.

Figure 13:
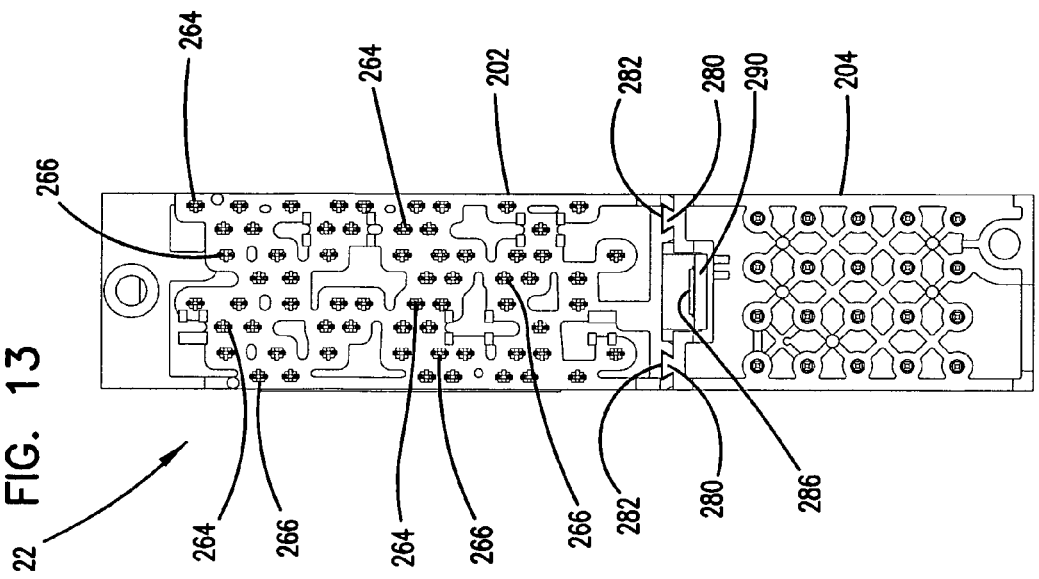
FIG. 13 is a rear view of the jack mount of FIG. 8.

To provide a detachable interface between the jack receiving piece 202 and the cross-connect piece 204, the cross-connect piece 204 includes two spaced-apart tongues 280 (shown in FIG. 8) that are slidingly received within corresponding spaced-apart grooves 282 (shown in FIG. 13) defined by the jack receiving piece 202. To connect the cross-connect piece 204 to the jack-receiving piece 202, the tongues 280 are aligned with the grooves 282 and the cross-connect piece 204 is slid from the back side 208 of the jack receiving piece 202 toward the front side 206. The tongues 280 are slid along the grooves 282 until the front face 278 of the cross-connect piece 204 engages a shoulder 284 defined by the piece 202. When the cross-connect piece 204 engages the shoulder 284, an upwardly projecting tab 286 (shown in FIG. 8) formed on the cross-connect piece 204 snaps within a locking opening 288 (shown in FIG. 14) defined by a resilient clip 290 formed at the bottom of the jack receiving piece 202. To remove the cross-connect piece 204 from the jack-receiving piece 202, the clip 290 is flexed upwardly such that the tab 286 disengages from the opening 288, and the lower piece 204 is pulled in a rearward direction from the upper body 202.

V. Twisted Pair Rear Interface

Figure 15:
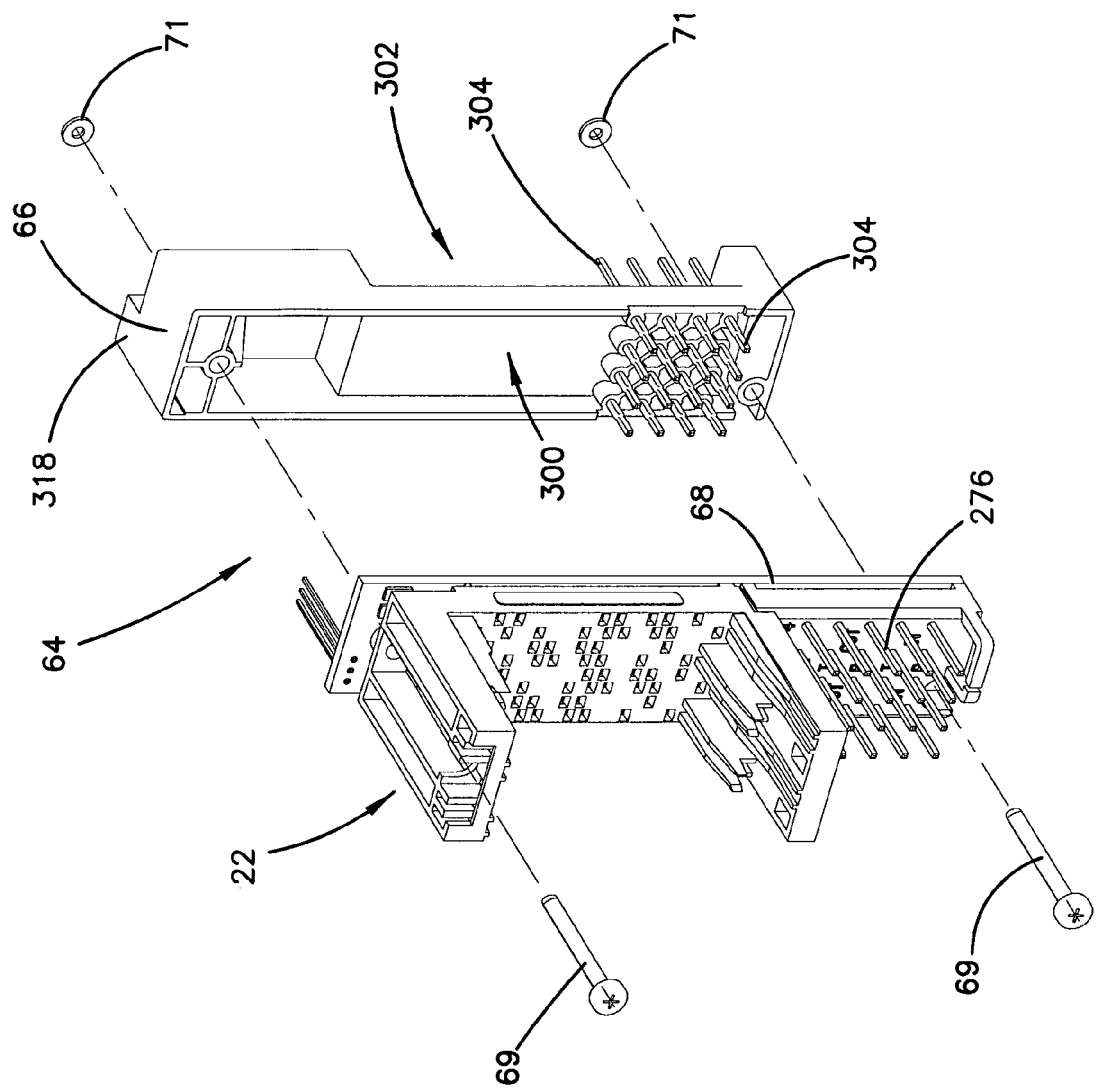
FIG. 15 is a front exploded view of a jack mount and twisted pair rear interface assembly in accordance with the principles of the present disclosure.
Figure 16:
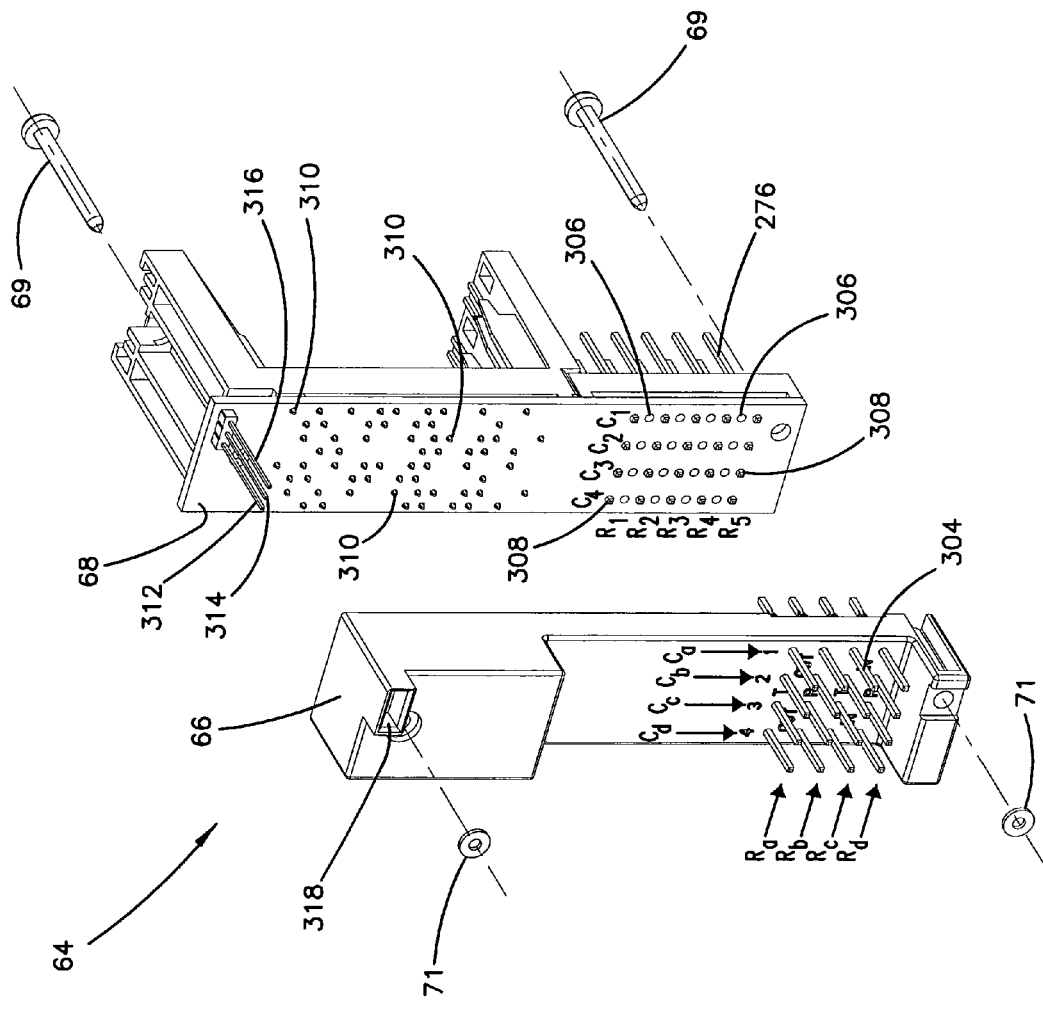
FIG. 16 is a rear exploded view of the jack mount and twisted pair rear interface assembly of FIG. 15.

FIG. 15 illustrates the dielectric support 66 of the rear interface assembly 64 removed from the circuit board 68. The dielectric support 66 includes a front side 300 adapted to face the circuit board 68, and a back side 302 adapted to face away from the circuit board 68. As shown in FIG. 16, the rear interface assembly 64 also includes four columns ($C_a$-$C_d$) and four rows ($R_a$-$R_d$) of wire termination members 304 press fit within holes defined by the dielectric support 66. The wire termination members 304 are shown as wire wrap members. However, it will be appreciated that other types of wire termination members such as insulation displacement connectors could also be used.

Referring to FIG. 16, the wire termination members 304 are adapted to contact plated through-holes 306 in the circuit board 68. Similarly, the wire termination members 276 of the jack mount 22 connect with plated through-holes 308 in the circuit board 68. The plated through-holes 306 are oriented in rows that are positioned between rows $R_1$-$R_5$. The circuit board 68 also includes a plurality of additional plated through-holes 310 positioned to make electrical contacts with the connector pins 268 that project outward from the back wall 214 of the jack mount upper piece 202 (shown in FIG. 12).

The dielectric support 66 of the rear interface assembly 64 defines a protective receptacle 318 in which a voltage lead 312, a return lead 314 and a sleeve ground lead 316 are mounted. The receptacle 318 is adapted to interconnect with the receptacles 54 formed on the power strip 52 of the chassis 20. When the jacks 62a and 62b are mounted within the jack mount 22, the voltage springs 141a, 141b of the jacks are placed in electrical connection with the voltage leads 312, the return spring 143a, 143b of the jacks 62a, 62b are placed in electrical connection with the return leads 314, and the ground springs 154a, 154b of the jacks 62a, 62b are placed in electrical connection with the shield ground leads 316.

Figure 17:
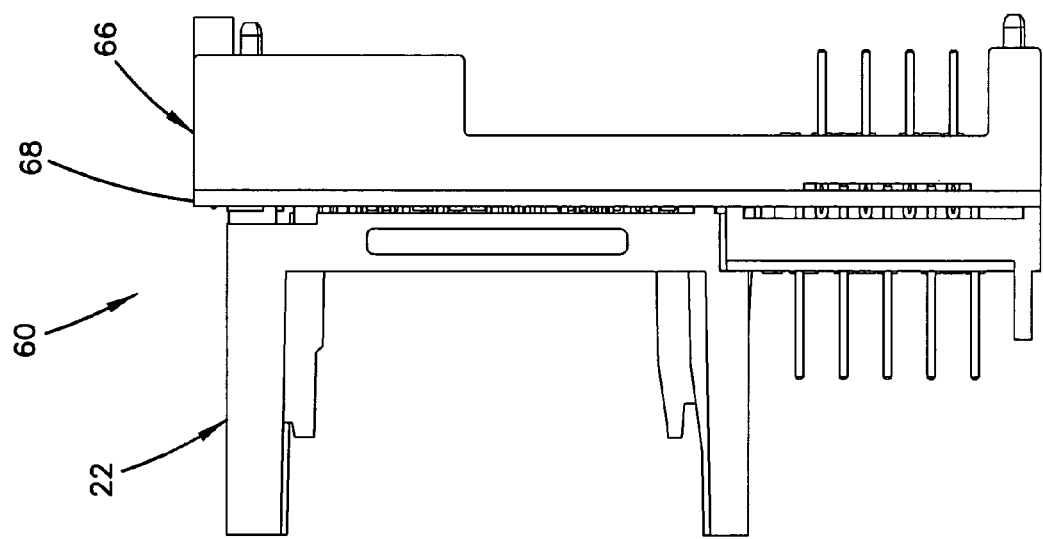
FIG. 17 is a side assembled view of the jack mount and twisted pair rear interface assembly of FIG. 15.

Referring to FIG. 17, when the jack assembly 60 is assembled, the printed circuit board 68 is positioned between the jack mount 22 and the dielectric support 66 (the jacks of the assembly are not shown in FIG. 17). The circuit board 68 includes a plurality of circuit paths for electrically connecting selected ones of the connection pins 268 to the receptacle leads 312, 314 and 316, to the wire termination members 304 of the rear interface assembly 64, and to the cross-connect wire termination members 276. The single circuit board 68 is adapted for connecting all four jacks 62a and 62b (shown in FIG. 1) to the leads 312, 314 and 316, and to the their corresponding columns of rear interface wire termination members 304 and cross-connect wire termination members 276. When the jacks 62a and 62b are removed from the jack mount 22, the jacks 62a and 62b are disconnected from the circuit board 68.

As shown in FIGS. 15 and 16, the circuit board 68, the jack mount 22 and the dielectric support 66 define coaxially aligned openings sized to receive fasteners 69 (e.g., bolts or screws) for connecting the pieces together. The fasteners 69 extend through captivation washers 71 that are press-fit over the fasteners 69. The captivation washers 71 and the fasteners 69 hold the jack mount 22, the circuit board 68 and the dielectric support 66 together after assembly and inhibit the pieces from being unintentionally pulled apart prior to connection to the chassis 20. The assembly 60 is connected to the chassis 20 by threading the fasteners within holes defined by the chassis 20 (e.g., holes defined by the flanges 42 and the coverplate 50 of the chassis 20).

In use of the jack assembly 60, columns $C_1$-$C_4$ of cross-connect wire termination member 276 are respectively connected to jacks positioned in mounting locations $ML_1$-$ML_4$. The wire termination members 276 of row $R_1$ are tracer lamp contacts (TL), the wire termination members 276 of row $R_2$ are cross-connect tip-out contacts (XTO), the wire termination members 276 of row $R_3$ are cross-connect ring-out contacts (XRO), the wire termination members 276 of row $R_4$ are cross-connect tip-in contacts (XTI), and the wire termination members 276 of row $R_5$ are cross-connect ring-in contacts (XRI).

Columns $C_a$-$C_d$ of the IN/OUT termination members 304 are respectively in electrical contact with jacks inserted within jack mounting locations $ML_1$-$ML_4$. The wire termination members 304 of row $R_a$ are tip-out contacts (TO), the wire termination members 304 forming row $R_b$ are ring-out contacts (RO), the wire termination members 304 forming row $R_c$ are tip-in contacts (TI), and the wire termination members 304 forming row $R_d$ are ring-in contacts (RI).

Figure 18:
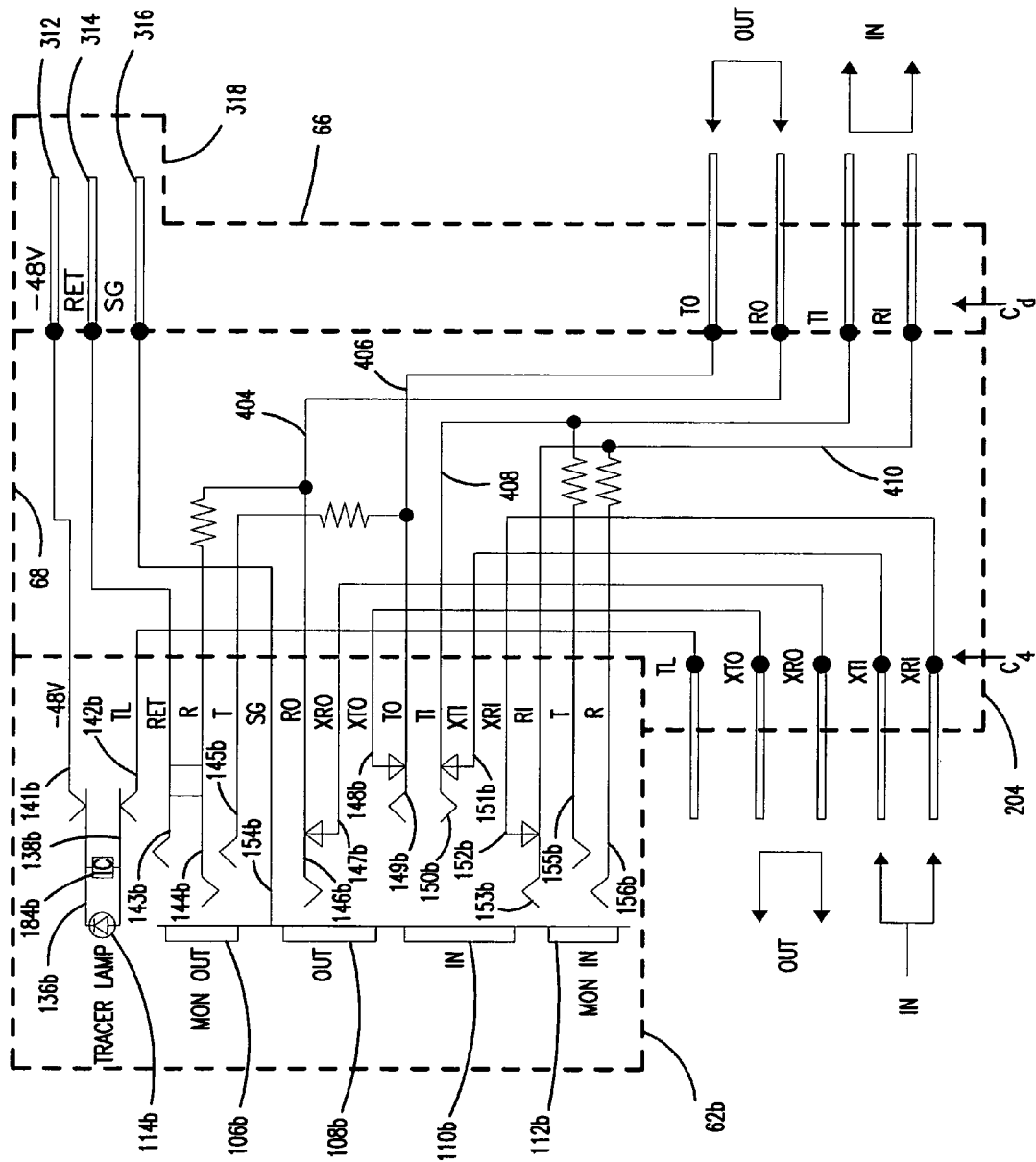
FIG. 18 is a schematic circuit diagram corresponding to the jack mount and twisted pair rear interface assembly of FIG. 15.

FIG. 18 is a circuit diagram illustrating the electrical connections made when one of the jacks 62b is inserted within jack mounting location $ML_4$. It will be appreciated that similar electrical configurations are used to interconnect jacks placed in mounting locations $ML_1$-$ML_3$ with the corresponding columns of contacts $C_1$-$C_3$ and $C_a$-$C_c$.

Referring to FIG. 18, the voltage spring 141b is electrically connected to an energized contact point (e.g., the voltage lead 312) for illuminating the LED. The tracer lamp spring 142b is connected to the tracer lamp contact TL of column $C_4$. The return spring 143b is connected to the return lead 314. The shield ground spring 154b is connected to the shield ground lead 316. The out ring spring 146b is connected to the ring-out contact RO by circuit path 404. The ring normal spring 147b is connected to the cross-connect ring-out contact XRO of column $C_4$. The tip normal spring 148b is connected to the cross-connect tip-out contact XTO of column $C_4$. Tip spring 149b is connected to the tip-out contact TO of column $C_d$ by circuit path 406. The monitor out ring spring 144b is connected to circuit path 404, and the monitor out tip spring 145b is connected to circuit path 406. Tip spring 150b is connected to the tip-in contact TI of column $C_d$ by circuit path 408. Tip normal spring 151b is connected to the cross-connect tip-in contact XTI of column $C_4$, and ring normal spring 152b is electrically connected to the cross-connect ring-in contact XRI of column $C_4$. Ring spring 153b is connected to the ring-in RI contact of column $C_d$ by circuit path 410. Tip spring 155b is connected to circuit path 408, while ring spring 156b is connected to circuit path 410.

Cross-connection of a signal from another jack arrives as an IN signal from cross-connect tip-in and ring-in contacts XTI and XRI of column $C_4$. With no plug inserted within the in port 110b, the IN signal is output at the tip-in and ring-in contacts TI and RI of column $C_d$.

By inserting a plug within the in port 110b, the IN signal from a cross-connected jack can be interrupted and a signal from the inserted plug can be outputted at points TI and RI. Similarly, by inserting a plug within the out port 108b, the OUT signal from contact points TO and RO is interrupted and may be outputted to the tip-and-ring contacts of the plug inserted within the out port 108b.

Frequently it is desirable to be able to monitor OUT signals arriving through contacts TO and RO without interrupting the OUT signals. To accomplish this, a plug is inserted into the monitor port 106b. On this occurrence, the plug is able to tap into the OUT signals being transmitted through circuit paths 404 and 406. Additionally, when the plug is inserted into the port 106b, the return spring 143b is biased upward into contact with the second lead 138b of the tracer lamp 114b. The electrical connection between the second lead 138b and the return spring 143b connects the LED circuit to the return line 314 thereby illuminating the LED. Integrated circuit chip 184b controls flashing of the LED 114b as is conventionally known in the art. In addition to activating the LED, insertion of a plug into the monitor port 106b also grounds the tracer lamp line TL causing illumination of a LED on a jack to which the present jack is cross-connected.

At times it is also desired to be able to monitor signals on the IN line without interrupting the IN line signal. To accomplish this, a plug is inserted into the monitor in port 112b. When the plug is inserted into the port 112b, the plug taps into the in signal being transmitted through circuit path 408 between contacts XTI and TI, and circuit path 410 between contacts XRI and RI.

VI. Coaxial Rear Interface Assembly

Figure 20:
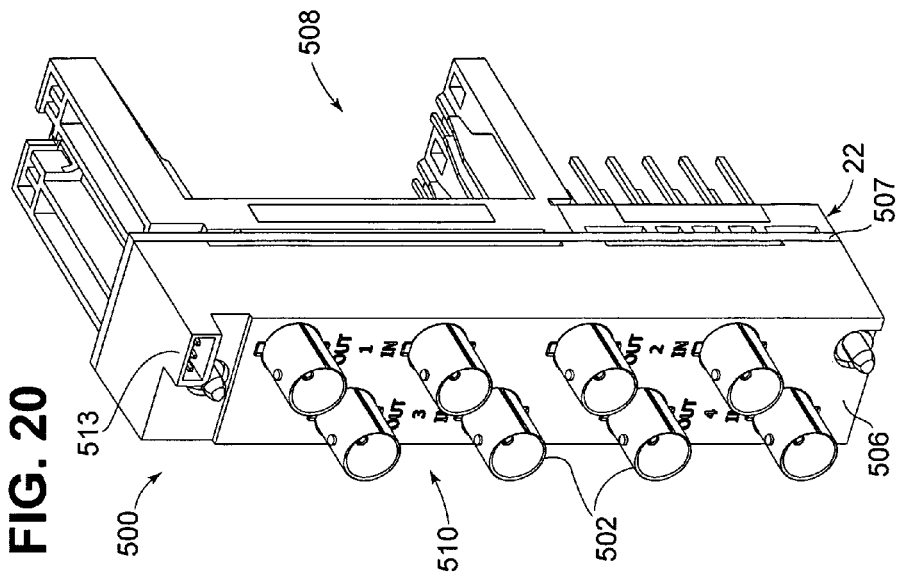
FIG. 20 illustrates a rear perspective view of the jack mount and the coaxial rear interface assembly of FIG. 19 in an assembled configuration.
Figure 19:
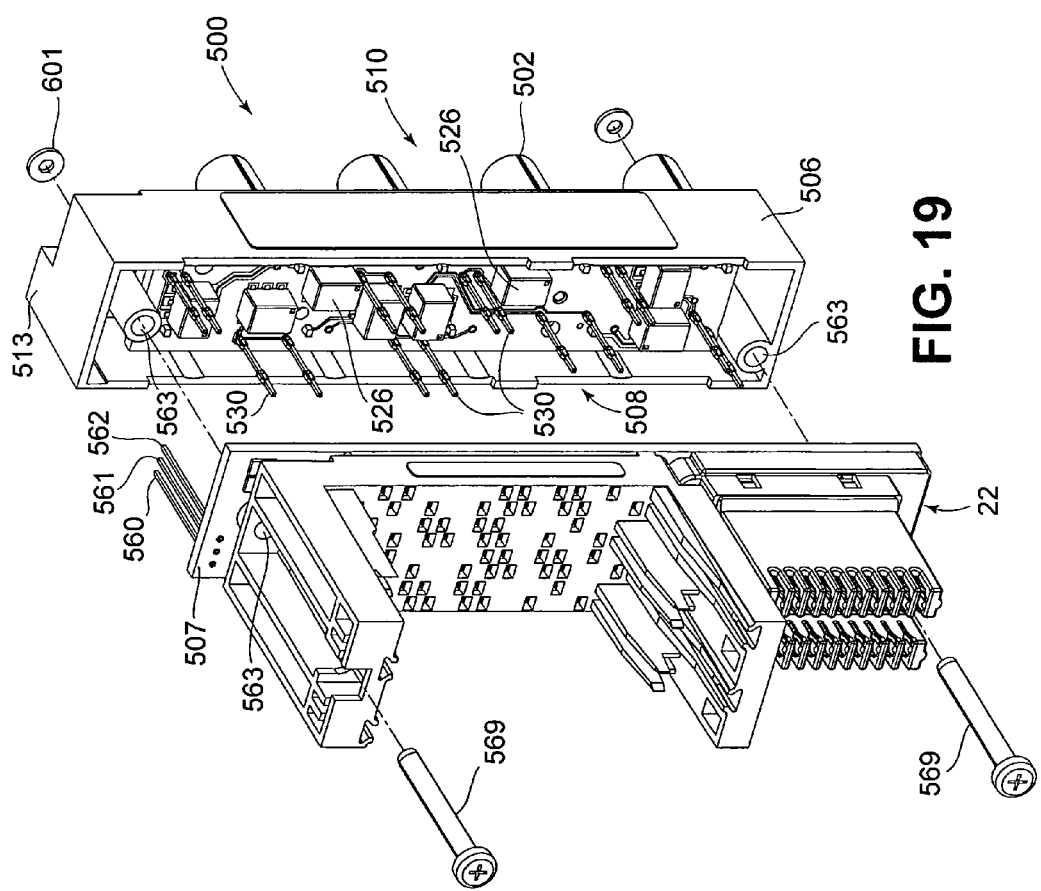
FIG. 19 is a front exploded view of a jack mount and coaxial rear interface assembly in accordance with the principles of the present disclosure.

FIGS. 19 and 20 illustrate a rear interface assembly 500 adapted to be secured to the jack mount 22. As shown in FIG. 20, the rear interface assembly 500 includes eight coaxial connectors 502. Four of the connectors 502 are IN connectors and four are OUT connectors. It will be appreciated that the rear interface assembly 500 and the rear interface assembly 64 are both compatible with or mountable on a common jack mount. Hence, the same jack can be used to manufacture jack assemblies suited for either twisted pair or coaxial type signals. By using common parts, manufacturing efficiency is enhanced.

FIG. 23 illustrates one of the connectors 502 configured for use with the rear interface assembly of FIGS. 19 and 20. As shown in FIG. 23, the connector 502 is a BNC type connector and includes a grounded main body 512 (i.e., outer shell), a center conductor 514, and an insulator 517 mounted between the center conductor 514 and the main body 512. The coaxial connector 502 includes a first end 501 that is configured to be a coaxial connection end and a second end 503 that is configured to be a rear interface assembly mounting end. The main body 512 includes a generally circular configuration as it extends from the first end 501 to the second end 503. The main body 512 includes one side that defines a generally flat side 505. The flat side includes a slightly rounded bump 509 extending longitudinally. As will be discussed in further detail below, each connector 502 is configured to be press-fit into one of the connector openings 511 defined on a dielectric support 506 of the rear interface assembly 500 (see FIGS. 24 and 26).

Still referring to FIG. 23, adjacent the second end 503 of the main body 512, the connector 502 defines a mounting structure 515. The mounting structure 515 includes a radial shoulder 525 that defines a rear flange 519 and a front lip 521. The front lip includes a ramped surface 523. As will be discussed in further detail below, the ramped lip 521 is configured to provide a press-fit with a cylindrical sleeve 527 defining the connector opening 511 formed on the dielectric support 506 of the rear interface assembly.

As illustrated in FIG. 24, the connector 502 is inserted into the cylindrical sleeve 527 defining a through-hole in a direction extending from the front side 508 of the dielectric support 506 toward a rear side 510. As the connector 502 is inserted into the connector opening 511, the ramped lip 521 contacts the inner sidewall 529 of the cylindrical sleeve 527 for a press-fit connection. The connector 502 is inserted until the rear flange 519 contacts a rear shoulder 591 of the cylindrical sleeve 527 to stop insertion of the connector 502.

The cylindrical sleeve 527 defining the connector opening 511 includes radially opposed notches 531. The notches 531 are adapted to mate with radially positioned projections 533 defined on the main body 512 of the connector 502. When the connectors 502 are inserted into the cylindrical sleeves 527, the notches 531 and the projections 533 perform a keying function to orient the connectors 502 in the correct orientation with respect to the dielectric support 506.

As shown in FIG. 24, the inner surfaces 535 of the sidewalls 537 of the dielectric support 506 also include indentations 539 extending in a direction from the front side 508 to the rear side 510 of the dielectric support 506. The indentations 539 are configured to mate with the bumps 509 defined on the flat sides 505 of the connector main body 512. The indentations 539 and the bumps 509 also perform a keying function in orienting the connectors 502 in the correct orientation with respect to the dielectric support 506 as the connectors 502 are inserted into the openings 511.

Figure 26:
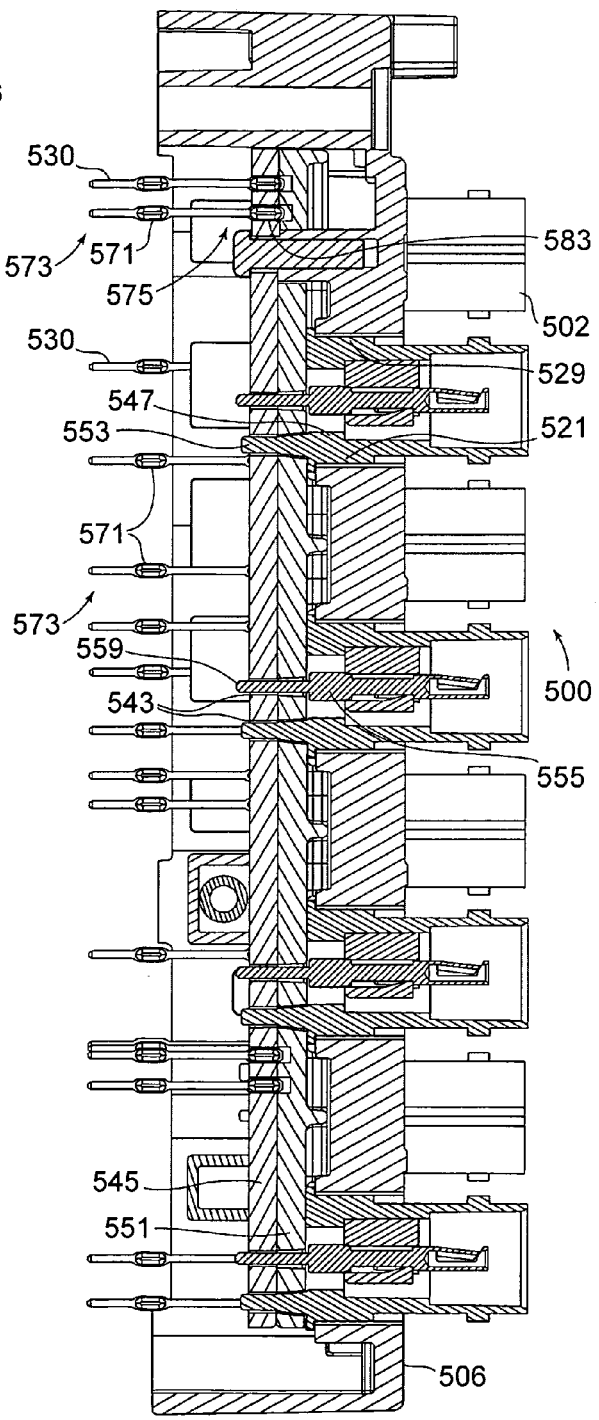
FIG. 26 is a cross-sectional view of the coaxial rear interface assembly taken along line 26-26 of FIG. 25.

The grounded main body 512 defines an axial projection 541 extending from the rear flange 519. As will be discussed in further detail below, the axial projection 541, as well as the center conductor 514 of the coaxial connectors, are configured to be inserted into plated through-holes 543 defined on a second circuit board 545 (see FIG. 26) of the rear interface assembly for an electrical connection. As shown in FIGS. 23, 24, and 26, a generally rectangular portion 547 of the axial projection 541 is configured to be press-fit into a hole 549 defined on a dielectric reinforcement structure 551 of the rear interface assembly and the circular end portion 553 of the axial projection 541 is configured to extend through the reinforcement structure 551 and contact the second circuit board 545 for an electrical connection. Regarding the center conductor 514 of the coaxial connectors 502, as illustrated in FIGS. 23, 24, and 26, an enlarged diameter portion 555 of the center conductor 514 is configured to fit within a hole 557 defined on the dielectric reinforcement structure 551 and the smaller-diameter end portion 559 of the center conductor 514 is configured to extend through the reinforcement structure 551 and contact the second circuit board 545 for an electrical connection.

The notches 531 defined within the cylindrical sleeves 527 and the radial projections 533 on the main body 512 of the connector 502 as well as the indentations 539 on the inner surfaces 535 of the sidewalls 537 of the dielectric support 506 and the bumps 509 defined on sides 505 of the main body 512 play a key role in initially orienting the connectors 502 correctly during insertion. In this manner, when a connector 502 is placed into a connector opening 511 defined on the dielectric support 506, the connector 502 is oriented correctly for an electrical connection with the rest of the rear interface assembly 500 through the second circuit board 545, as will be described in further detail below.

While a BNC type connector is shown in the Figures, it will be appreciated that other types of coaxial connectors, such as 1.6/5.6 type connectors, could be used with the rear interface assembly 500.

Referring back to FIGS. 19 and 20, the rear interface assembly 500 includes the dielectric support 506 having a front side 508 that faces the jack mount 22 and a back side 510 that faces away from the jack mount 22. A first circuit board 507 is positioned between the support 506 and the jack mount 22. The coaxial connectors 502 project outwardly from the back side 510 to provide access for connections. As discussed above, connectors 502 are mounted within cylindrical sleeves 527 defined in the dielectric support 506 by a press-fit (see FIGS. 24 and 26).

The first circuit board 507, the jack mount 22 and the dielectric support 506 define coaxially aligned openings 563 sized to receive fasteners 569 (e.g., bolts or screws) for connecting the pieces together. The fasteners 569 are preferably press fit through captivation washers 601 that hold the pieces 22, 507 and 506 together after assembly. The fasteners 569 are also used to connect the pieces 22, 507 and 506 to the chassis 20 (shown in FIG. 1).

A receptacle 513 for connection to one of the receptacles 54 of the power strip 52 also projects outwardly from the back side 510. The receptacle 513 is arranged to house a voltage lead 562, a return lead 561 and a sleeve ground lead 560. The leads 560-562 are electrically connected to the first circuit board 507, as shown in FIG. 19.

Figure 22:
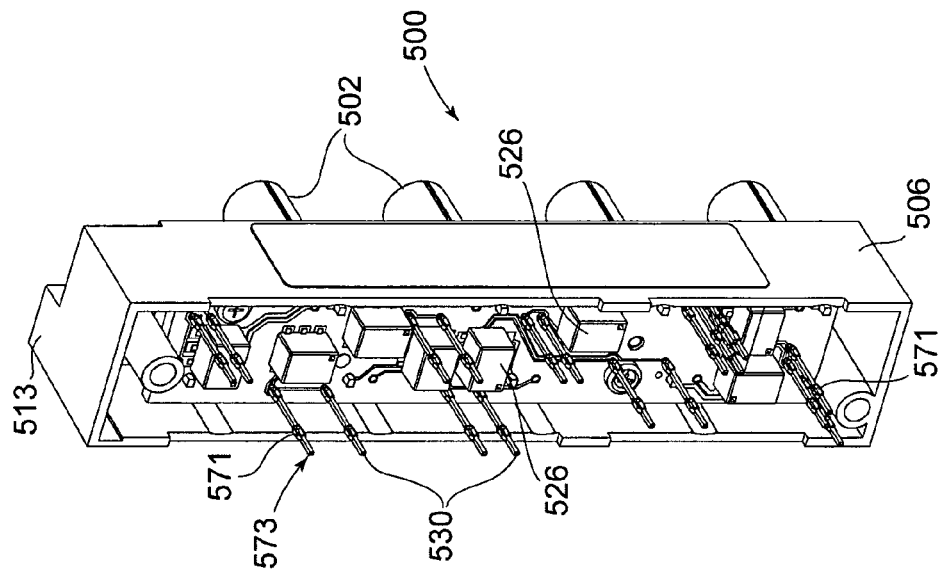
FIG. 22 is a front perspective view of the coaxial rear interface assembly of FIG. 21.
Figure 21:
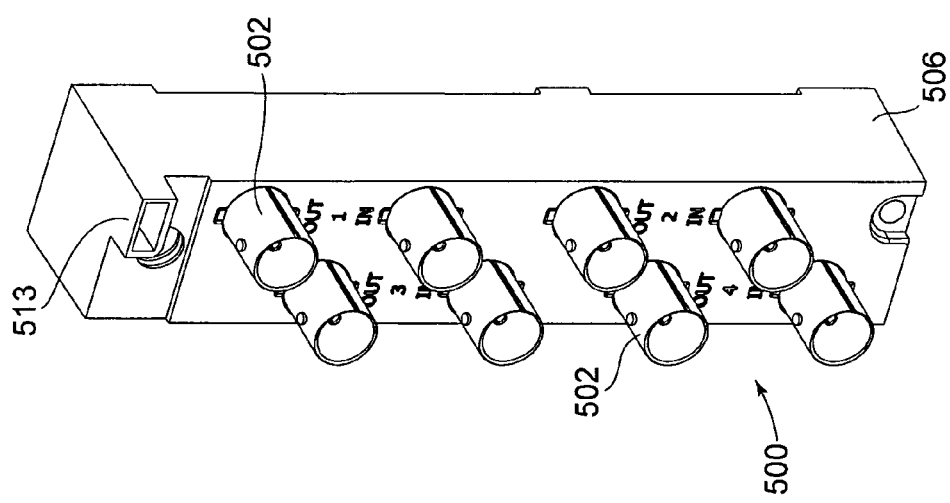
FIG. 21 is a rear perspective view of the coaxial rear interface assembly of FIG. 19.

FIGS. 21 and 22 illustrate the coaxial rear interface assembly 500 separated from the jack mount 22. FIG. 24 illustrates the details of the coaxial rear interface assembly 500 in an exploded view.

Referring to FIG. 24, the coaxial rear interface assembly 500 includes the dielectric support 506 with coaxial connectors 502 mounted therein. The coaxial interface assembly also includes the second circuit board 545, as discussed above, with the dielectric reinforcement structure 551 positioned between the coaxial connectors 502 and the second circuit board 545. The dielectric reinforcement structure 551 and the second circuit board 545 are configured to be housed within the dielectric support 506 of the coaxial rear interface assembly 500 once it is assembled (see FIG. 22). The second circuit board 545, the reinforcement structure 551 and the dielectric support 506 define coaxially aligned openings 565 sized to receive fasteners 567 (e.g., bolts or screws) for connecting these pieces together. The reinforcement structure 551 also includes a projection 577 configured to fit within a hole 579 defined on the second circuit board 545 for aligning the two structures.

Still referring to FIG. 24, the second circuit board 545 includes a plurality of baluns 526 mounted thereon. One balun 526 corresponds to each connector 502. When the rear interface assembly 500 is assembled, the axial projection 541 of the grounded main body 512 and the center conductor 514 of each connector 502 extend through holes 549, 557, respectively, of the reinforcement structure 551 and make electrical contact with the second circuit board 545. The axial projection 541 and the center conductor 514 are inserted into and contact the plated through-holes 543 defined on the second circuit board 545. Circuit tracings 587 are defined between each balun 526 and the plated through-holes 543 for establishing an electrical connection with the coaxial connectors 502. While the circuit tracings 587 are shown in the Figures as being located on the same side of the second circuit board 545 as the baluns 526, it will be appreciated that in other embodiments, the circuit tracings 587 may be located on the opposite side of the second circuit board 545.

Referring to FIGS. 24 and 26, a plurality of connection pins 530 are press fit or staked into the second circuit board 545. Pins 530 provide an electrical connection between the second circuit board 545 and the first circuit board that is located between the jack mount 22 and the rear interface assembly 500 (see FIG. 19). In one embodiment, the pins 530 are dual compliant pins that include compliant portions 571 at both ends 573, 575 of the pins 530. As shown in FIG. 26, the compliant portion 571 of a first end 575 of the pin 530 is press-fit into plated holes defined on the second circuit board 545. As shown, the reinforcement structure 551 includes blind holes 583 that accommodate the first ends 575 of the dual compliant pins 530 that project through the second circuit board 545.

As referred to herein, compliant portions of pins 530 are portions that project beyond a normal radial periphery of the pin and are compressible, normally, through deformation, to form a high pressure electrical connection. Compliant pins are generally known in the art. An example of a dual compliant pin (i.e., a pin having compliant portions at both ends), such as pin 530, is disclosed in U.S. Pat. No. 6,623,280, the entire disclosure of which is incorporated herein by reference.

Figure 25:
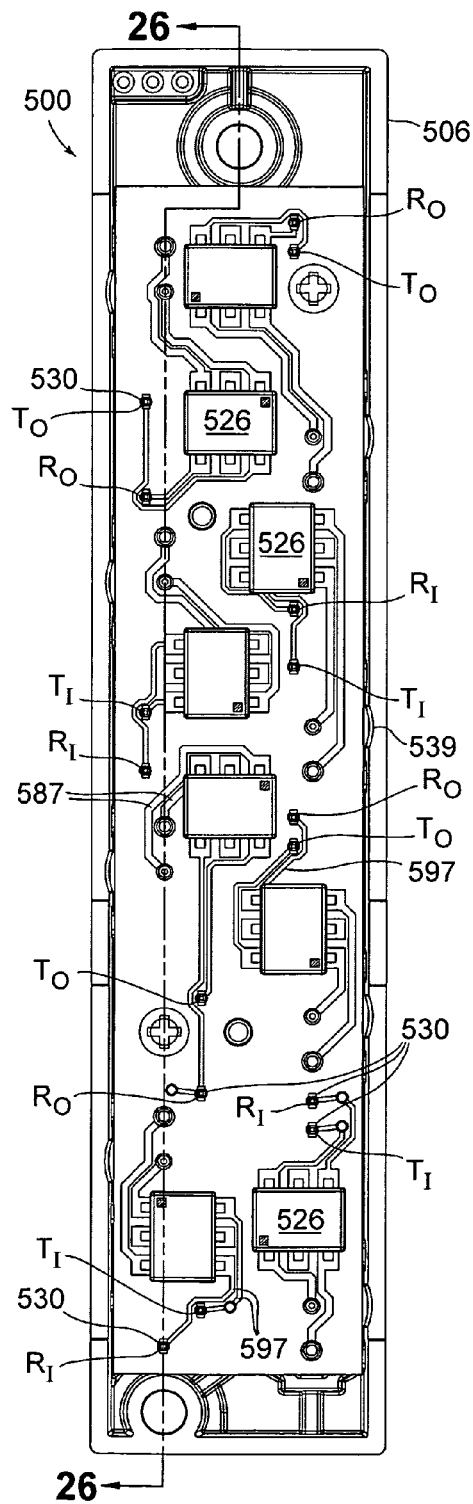
FIG. 25 is a front view of the coaxial rear interface assembly of FIG. 21.

Referring to FIG. 25, tracings 597 between the baluns 526 and the pins 530 provide an electrical connection on the second circuit board 545. As noted above with respect to the circuit tracings 587, while the circuit tracings 597 are shown in the Figures as being located on the same side of the second circuit board 545 as the baluns 526, it will be appreciated that in other embodiments, the circuit tracings 597 may be located on the opposite side of the second circuit board 545. Once the pins 530 are inserted into the second circuit board 545, they project outwardly from the front side 508, wherein the second ends 573 of the pins, that also include compliant portions 571, are configured to be inserted into the first circuit board 507. The pins 530 are arranged in a predetermined array that corresponds to an array of contacts (e.g., plated through-holes) of the first circuit board 507. To accommodate the arrangement of the pins 530, the circuit board 507 typically has a different contact and circuit pathway configuration than the circuit board 68 of the twisted pair rear interface assembly 64.

Figure 27:
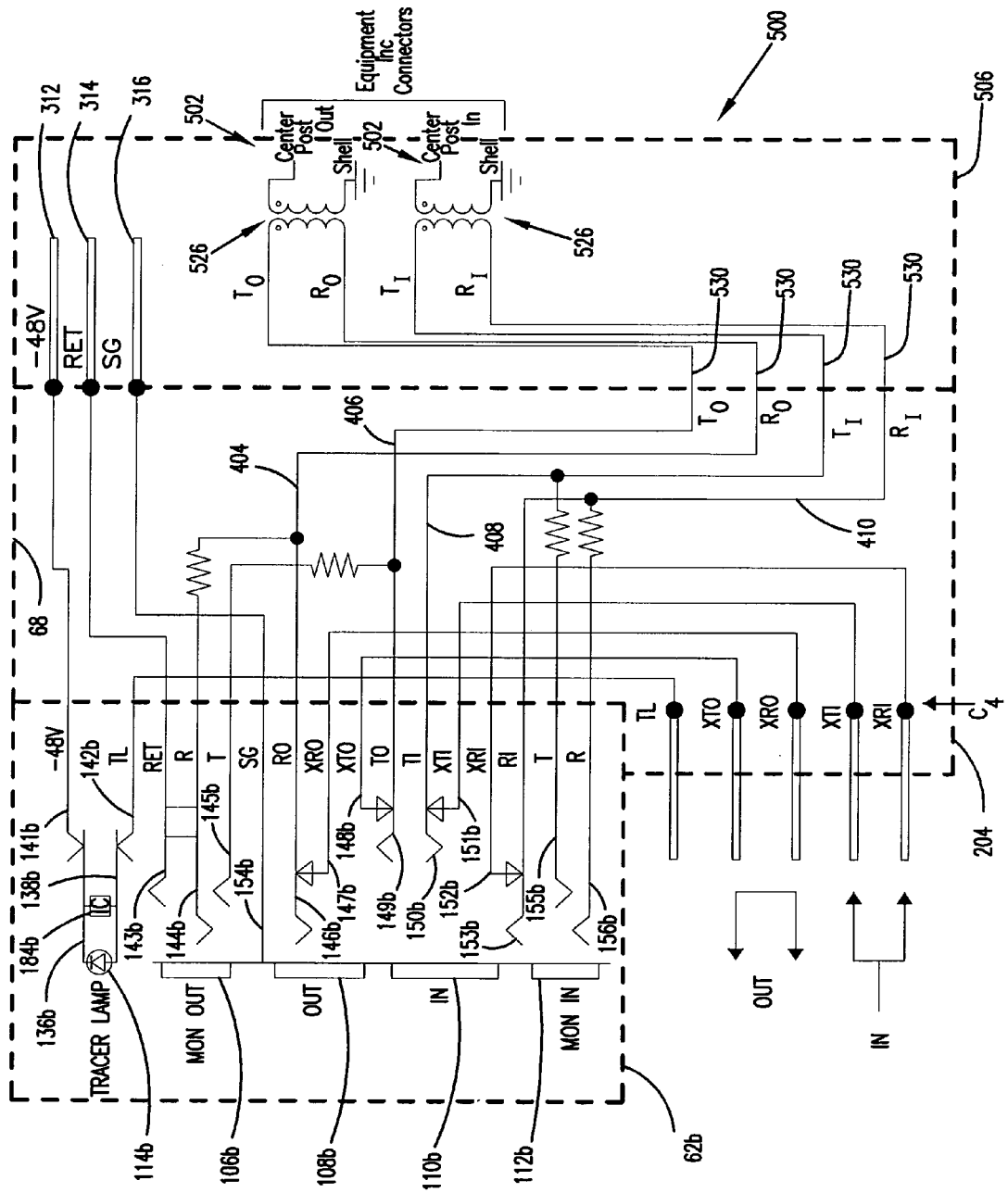
FIG. 27 is a schematic circuit diagram corresponding to the jack mount and the coaxial rear interface assembly of FIG. 19.

Referring to FIGS. 22, 24, and 25, the conductive pins 530 are divided into eight pairs of tip and ring contacts with each pair of tip and ring contacts corresponding to one of the connectors 502. The pairs of pins 530 corresponding to the OUT connectors 502 have been labeled TO (tip out) and RO (ring out), while the pairs of pins 530 corresponding to the IN connectors 502 have been labeled TI (tip in) and RI (ring in). When a coaxial signal arrives through one of the OUT connectors 502, the balun 526 corresponding to the connector converts the unbalanced coaxial signals to balanced twisted pair signals (i.e., tip and ring signals). The tip signal is forwarded from the balun 526 to its corresponding TO pin and the ring signal is forwarded to its corresponding RO pin. From the RO and TO pins, the signals are directed to a corresponding jack mounted within the jack mount 22 via circuit pathways on the first circuit board 507. The baluns 526 corresponding to the IN connectors 502 are adapted to convert balanced twisted pair signals into unbalanced coaxial signals. For example, when tip and ring signals from a cross-connected jack arrive at one of the baluns 526, the balun 526 converts the tip and ring signals into a coaxial signal that is outputted through the balun's corresponding IN connector. It will be appreciated that the electrical pathways that connect the TO, RO, TI and RI pins to corresponding jacks mounted within the jack mount 22 can be schematically depicted in that same manner as the TO, RO, TI and RI contacts of FIG. 18. It will also be appreciated that the baluns 526 function to match the impedance between the unbalanced coaxial signals and the balanced twisted pair signals. FIG. 27 illustrates a schematic circuit diagram corresponding to the jack mount 22 and the coaxial rear interface assembly 500.

Having described preferred aspects and embodiments of the present disclosure, modifications and equivalents of the disclosed concepts may readily occur to one skilled in the art. However, it is intended that such modifications and equivalents be included within the scope of the claims which are appended hereto.

We claim:

1. A jack assembly comprising:
   a jack mount having a front side and a rear side, the jack mount also including top and bottom supports defining a jack receiving region that opens outward toward the front side of the jack mount;
   a jack insert adapted to be slidably mounted in the jack receiving region defined between the top and bottom supports of the jack mount, the jack insert including a jack body formed of a dielectric material, the jack body defining a plurality of bores sized to receive plugs having tip and ring contacts;
   the jack insert including a plurality of electrically conductive tip and ring springs, the tip springs being adapted to make electrical contact with the tip contacts of the plugs when the plugs are inserted within the bores, and the ring springs being adapted to make electrical contact with the ring contacts of the plugs when the plugs are inserted within the bores;
   the jack insert including a plurality of normal contacts adapted to normally make electrical contact with the tip and ring springs;
   a plurality of cross-connect contacts;
   a rear interface assembly including a dielectric support having a first side that faces the jack mount and a second side that faces away from the jack mount, the rear interface assembly also including a plurality of rear coaxial connectors that project outwardly from the second side of the dielectric support;
   a first circuit board positioned between the jack mount and the dielectric support of the rear interface assembly, the first circuit board being configured to provide electrical connections between the rear coaxial connectors and the tip and ring springs, the first circuit board also being configured to provide electrical connections between the cross-connect contacts and the normal contacts;
   the rear interface assembly further including a second circuit board positioned between the first circuit board and the rear coaxial connectors, the second circuit board including a plurality of baluns mounted thereon, the plurality of baluns electrically connected to the rear coaxial connectors through the second circuit board, the second circuit board electrically connected to the first circuit board to establish electrical connections between the rear coaxial connectors and the tip and ring springs, wherein the first circuit board is electrically connected to the second circuit board by conductive pins having compliant portions at first and second ends of the pins, the compliant portions at the first ends of the pins press-fit into the first circuit board and the compliant portions at the second ends of the pins press-fit into the second circuit board;
   a dielectric reinforcement structure positioned within the dielectric support between the second circuit board and the rear coaxial connectors, the dielectric reinforcement structure including a dielectric plate extending along the second circuit board from a first end of the second circuit board to a second end of the second circuit board, the dielectric plate configured to provide structural reinforcement to the second circuit board, the dielectric plate receiving portions of the pins projecting rearwardly through the second circuit board;
   a resilient retaining member connected to one of the jack insert and the jack mount for securing the jack insert within the jack mount, the resilient retaining member being moveable between a first position in which the retaining member is adapted to retain the jack insert within the jack mount, and a second position in which the jack insert can be inserted into or removed from the jack mount; and
   an electrical interface between the jack insert and the first circuit board, the electrical interface being configured such that when the jack insert is removed from the jack mount, the jack insert is electrically disconnected from the first circuit board.

2. The jack mount assembly of claim 1, wherein the dielectric support includes blind holes that accommodate the second ends of the pins that project rearwardly through the second circuit board.

3. The jack assembly of claim 1, wherein the jack insert is one of a plurality of jack inserts mountable within the jack mount, each of the jack inserts including a separate resilient retaining member for individually retaining each jack insert within the jack mount.

4. The jack assembly of claim 1, wherein the rear coaxial connectors are mounted on the dielectric support by a press-fit.

5. The jack assembly of claim 4, wherein the rear coaxial connectors are inserted into openings formed on the dielectric support in a direction extending from the first side toward the second side.

6. The jack assembly of claim 1, wherein the rear coaxial connectors are removably mounted on the dielectric support, the dielectric support and the rear coaxial connectors including keying structures for orienting the rear coaxial connectors in the correct orientation with respect to the dielectric support when mounting.

7. The jack assembly of claim 1, wherein the jack insert includes a first LED having first and second electrical leads, wherein the cross-connect contacts include a tracer lamp contact, and wherein the first lead is electrically connected to a power source and the second lead is electrically connected to the tracer lamp contact.

8. The jack assembly of claim 7, wherein one of the bores comprises a monitor bore and the jack insert further includes a return spring positioned between the monitor bore and the first LED, the return spring being positioned such that when a plug is inserted into the monitor bore, the return spring is pressed against the second lead of the first LED causing the first LED and a second LED of a second jack insert corresponding to the tracer lamp to be illuminated.

9. The jack assembly of claim 1, wherein the jack insert includes a front face positioned opposite from a rear face, the bores of the jack insert being defined by the front face, the jack insert including contact members that project outward from the rear face, the contact members being configured to form a portion of the electrical interface between the jack insert and the first circuit board, and the contact members being electrically connected to the normal contacts, the tip springs and the ring springs.

10. The jack assembly of claim 1, wherein each rear coaxial connector includes a central pin and at least one ground extension that project into plated openings defined by the second circuit board.

11. A jack mount assembly comprising:
a jack mount having a front side and a rear side, the jack mount including electrical contacts that project outwardly from the rear side;
a rear interface assembly positioned at the rear side of the jack mount, the rear interface assembly including a dielectric support having a first side that faces the jack mount and a second side that faces away from the jack mount, the rear interface assembly including a plurality of rear coaxial connectors that project outwardly from the second side of the dielectric support, and
a first circuit board positioned between the jack mount and the dielectric support of the rear interface assembly, the first circuit board electrically connected to the electrical contacts of the jack mount;
wherein the rear interface assembly includes a second circuit board positioned between the first circuit board and the rear coaxial connectors, the second circuit board including a plurality of baluns mounted thereon, the plurality of baluns electrically connected to the rear coaxial connectors through the second circuit board, the second circuit board electrically connected to the first circuit board to establish electrical connections between the rear coaxial connectors and the electrical contacts of the jack mount, wherein the first circuit board is electrically connected to the second circuit board by conductive pins having compliant portions at first and second ends of the pins, the compliant portions at the first ends of the pins press-fit into the first circuit board and the compliant portions at the second ends of the pins press-fit into the second circuit board, wherein the rear interface assembly further includes a dielectric reinforcement structure positioned within the dielectric support between the second circuit board and the rear coaxial connectors, the dielectric reinforcement structure including a dielectric plate extending along the second circuit board from a first end of the second circuit board to a second end of the second circuit board, the dielectric plate configured to provide structural reinforcement to the second circuit board, the dielectric plate receiving portions of the pins projecting rearwardly through the second circuit board.

12. The jack mount assembly of claim 11, wherein the dielectric support includes blind holes that accommodate the second ends of the pins that project rearwardly through the second circuit board.

13. The jack mount assembly of claim 11, wherein the rear coaxial connectors are mounted on the dielectric support by a press-fit.

14. The jack mount assembly of claim 11, wherein the rear coaxial connectors are removably mounted on the dielectric support, the dielectric support and the rear coaxial connectors including keying structures for orienting the rear coaxial connectors in the correct orientation with respect to the dielectric support when mounting.

15. A telecommunications device comprising:
a jack module having a front side and a back side, the jack module including:
a jack mount;
a plurality of jack inserts adapted to be mounted to the jack mount, the jack inserts including ports adapted for receiving plugs, the jack inserts including switches for contacting the plugs when the plugs are inserted within the ports, the ports being located at the front side of the jack module when the jack inserts are mounted to the jack mount, the jack inserts including conductive tails, the jack mount including sockets for receiving the conductive tails when the jack inserts are mounted to the jack mount;
a cross-connect array including termination structures located at the front side of the jack module;
a first circuit board including a first portion located behind the jack mount and a second portion located behind the cross-connect array, the first portion of the first circuit board electrically connected to the sockets of the jack mount with contact members and the second portion of the first circuit board being electrically connected to the termination structures of the cross-connect array;
a second circuit board located behind the first circuit board, the first circuit board electrically connected to the second circuit board by conductive pins having compliant portions at first and second ends of the pins, the compliant portions at the first ends of the pins press-fit into the first circuit board and the compliant portions at the second ends of the pins press-fit into the second circuit board;
a plurality of rear coaxial connectors positioned behind the second circuit board and electrically connected to the second circuit board to establish electrical connections between the plurality of rear coaxial connectors and the switches of the jack inserts, wherein the second circuit board includes baluns mounted thereon, the baluns electrically connected to the rear coaxial connectors through the second circuit board; and
a dielectric reinforcement structure positioned between the second circuit board and the rear coaxial connectors, the dielectric reinforcement structure including a dielectric plate extending along the second circuit board from a first end of the second circuit board to a second end of the second circuit board, the dielectric plate configured to provide structural reinforcement to the second circuit board, the dielectric plate receiving portions of the pins projecting rearwardly through the second circuit board.

16. A telecommunications device comprising:

a chassis having a front side and a rear side;

a plurality of jack inserts mounted in the chassis, the jack inserts including ports adapted for receiving plugs, the jack inserts including switches for contacting the plugs when the plugs are inserted within the ports, the ports being located at the front side of the chassis, the jack inserts including conductive tails projecting toward the rear side of the chassis;

a cross-connect array including termination structures located at the front side of the chassis;

a first circuit board including a first portion located behind the plurality of jack inserts and a second portion located behind the cross-connect array, the first portion of the first circuit board electrically connected to the conductive tails of the jack inserts and the second portion of the first circuit board being electrically connected to the termination structures of the cross-connect array;

a second circuit board located behind the first circuit board, the first circuit board electrically connected to the second circuit board by conductive pins having compliant portions at first and second ends of the pins, the compliant portions at the first ends of the pins press-fit into the first circuit board and the compliant portions at the second ends of the pins press-fit into the second circuit board;

a plurality of rear coaxial connectors positioned behind the second circuit board and electrically connected to the second circuit board to establish electrical connections between the plurality of rear coaxial connectors and the switches of the jack inserts, wherein the second circuit board includes baluns mounted thereon, the baluns electrically connected to the rear coaxial connectors through the second circuit board; and a dielectric reinforcement structure positioned between the second circuit board and the rear coaxial connectors, the dielectric reinforcement structure including a dielectric plate extending along the second circuit board from a first end of the second circuit board to a second end of the second circuit board, the dielectric plate configured to provide structural reinforcement to the second circuit board, the dielectric plate receiving portions of the pins projecting rearwardly through the second circuit board.

17. A jack assembly comprising:

a plurality of jack bodies, the jack bodies including a front side and a rear side, the jack bodies including ports adapted for receiving plugs having tip and ring contacts, the jack bodies including a plurality of electrically conductive tip and ring springs, the tip springs being adapted to make electrical contact with the tip contacts of the plugs when the plugs are inserted within the ports, and the ring springs being adapted to make electrical contact with the ring contacts of the plugs when the plugs are inserted within the ports;

the jack bodies including a plurality of normal contacts adapted to normally make electrical contact with the tip and ring springs;

a plurality of cross-connect contacts;

a rear interface assembly including a dielectric support having a first side that faces the jack bodies and a second side that faces away from the jack bodies, the rear interface assembly also including a plurality of rear coaxial connectors that project outwardly from the second side of the dielectric support;

a first circuit board positioned between the jack mount and the dielectric support of the rear interface assembly, the first circuit board being configured to provide electrical connections between the rear coaxial connectors and the tip and ring springs, the first circuit board also being configured to provide electrical connections between the cross-connect contacts and the normal contacts;

the rear interface assembly further including a second circuit board positioned between the first circuit board and the rear coaxial connectors, the second circuit board including a plurality of baluns mounted thereon, the plurality of baluns electrically connected to the rear coaxial connectors through the second circuit board, the second circuit board electrically connected to the first circuit board to establish electrical connections between the rear coaxial connectors and the tip and ring springs, wherein the first circuit board is electrically connected to the second circuit board by conductive pins having compliant portions at first and second ends of the pins, the compliant portions at the first ends of the pins press-fit into the first circuit board and the compliant portions at the second ends of the pins press-fit into the second circuit board; and a dielectric reinforcement structure positioned within the dielectric support between the second circuit board and the rear coaxial connectors, the dielectric reinforcement structure including a dielectric plate extending along the second circuit board from a first end of the second circuit board to a second end of the second circuit board, the dielectric plate configured to provide structural reinforcement to the second circuit board, the dielectric plate receiving portions of the pins projecting rearwardly through the second circuit board.

\* \* \* \* \*